US012336969B2

(12) United States Patent
Skeuse et al.

(10) Patent No.: US 12,336,969 B2
(45) Date of Patent: Jun. 24, 2025

(54) SENSING RETRIEVAL OF PILLS

(71) Applicant: HERO HEALTH INC., New York, NY (US)

(72) Inventors: Kevin Robert Skeuse, New York, NY (US); Raymond John Ring, III, Alexandria, VA (US); Jake Lebovits, New York, NY (US); Craig Sunada, Leonardo, NJ (US)

(73) Assignee: HERO HEALTH INC., New York, NY (US)

( * ) Notice: Subject to any disclaimer, the term of this patent is extended or adjusted under 35 U.S.C. 154(b) by 136 days.

(21) Appl. No.: 17/567,784

(22) Filed: Jan. 3, 2022

(65) Prior Publication Data

US 2022/0202652 A1 Jun. 30, 2022

Related U.S. Application Data

(60) Provisional application No. 63/132,923, filed on Dec. 31, 2020.

(51) Int. Cl.
*A61J 7/00* (2006.01)

(52) U.S. Cl.
CPC .......... *A61J 7/0084* (2013.01); *A61J 7/0069* (2013.01); *A61J 2200/30* (2013.01); *A61J 2200/74* (2013.01)

(58) Field of Classification Search
CPC .... A61J 7/0084; A61J 7/0069; A61J 2200/30; A61J 2200/74

(Continued)

(56) References Cited

U.S. PATENT DOCUMENTS 3,224,634 A 12/1965 Semsch
3,998,356 A 12/1976 Christensen et al.

(Continued)

FOREIGN PATENT DOCUMENTS

CN 105407857 3/2016
CN 216942046 U * 7/2022

(Continued)

OTHER PUBLICATIONS

The International Bureau of WIPO, "International Preliminary Report on Patentability," issued in related International Patent Application No. PCT/US2022/011050 mailed Jul. 13, 2023 (7 pages).

(Continued)

*Primary Examiner* — Rakesh Kumar
(74) *Attorney, Agent, or Firm* — The Marbury Law Group, PLLC

(57) ABSTRACT

A system for dispensing pills may include a plurality of containers, a retrieval arm movable into the plurality of containers to retrieve contents from the plurality of containers, a carrier supporting the plurality of containers, the carrier movable to adjust positions of the plurality of containers relative to a predetermined position, and a weighing assembly. The weighing assembly may include an actuator and a weight sensor. The actuator may be actuatable to control mechanical communication between the weight sensor and one of the plurality of containers at the predetermined position, and the weight sensor may be operable to measure weight of the one of the plurality of containers in mechanical communication with the weight sensor at the predetermined position.

16 Claims, 12 Drawing Sheets

(58) Field of Classification Search
USPC .......................................................... 221/233
See application file for complete search history.

(56) References Cited

U.S. PATENT DOCUMENTS

| | | | |
|---|---|---|---|
| 4,047,635 | A | 9/1977 | Bennett et al. |
| 4,402,425 | A | 9/1983 | Von Schuckmann et al. |
| 4,695,954 | A | 9/1987 | Rose et al. |
| 4,712,460 | A | 12/1987 | Story et al. |
| 4,782,980 | A | 11/1988 | Heimlich et al. |
| 4,854,478 | A | 8/1989 | Gyimothy |
| 5,240,139 | A | 8/1993 | Chirnomas |
| 5,240,193 | A | 8/1993 | Chirnomas |
| 5,472,113 | A | 12/1995 | Shaw et al. |
| 5,490,610 | A | 2/1996 | Pearson et al. |
| 5,502,944 | A | 4/1996 | Kraft et al. |
| 5,559,503 | A | 9/1996 | Blahut |
| 5,571,258 | A | 11/1996 | Pearson |
| 5,597,995 | A | 1/1997 | Williams et al. |
| 5,646,912 | A | 7/1997 | Cousin et al. |
| 5,755,357 | A | 5/1998 | Liber et al. |
| 5,791,515 | A | 8/1998 | Khan et al. |
| 5,941,363 | A | 8/1999 | Partyka et al. |
| 6,004,020 | A | 12/1999 | Bartur et al. |
| 2,018,515 | A | 1/2000 | Sorber et al. |
| 6,142,337 | A | 11/2000 | Schreckenberg et al. |
| 6,253,955 | B1 | 7/2001 | Bower et al. |
| 6,367,473 | B1 | 4/2002 | Kafer et al. |
| 6,371,297 | B1 | 4/2002 | Cha |
| 6,411,567 | B1 | 6/2002 | Niemiec et al. |
| 6,471,087 | B1 | 10/2002 | Shusterman |
| 6,507,275 | B2 | 1/2003 | Romano et al. |
| 6,529,801 | B1 | 3/2003 | Rosenblum |
| 6,604,019 | B2 | 8/2003 | Ahlin et al. |
| 6,662,081 | B1 | 12/2003 | Jacober et al. |
| 6,685,678 | B2 | 2/2004 | Evans et al. |
| 6,732,884 | B2 | 5/2004 | Topliffe et al. |
| 6,805,259 | B2 | 10/2004 | Stevens et al. |
| 6,892,941 | B2 | 5/2005 | Rosenblum |
| 6,948,634 | B2 | 9/2005 | Evans et al. |
| 7,006,894 | B2 | 2/2006 | De La Huerga et al. |
| 7,073,685 | B1 | 7/2006 | Giraud et al. |
| 7,080,755 | B2 | 7/2006 | Laliberte et al. |
| 7,155,306 | B2 | 12/2006 | Haitin et al. |
| 7,170,823 | B2 | 1/2007 | Fabricius et al. |
| 7,198,172 | B2 | 4/2007 | Lintell et al. |
| 7,253,411 | B2 | 8/2007 | Kaushal et al. |
| 7,382,263 | B2 | 6/2008 | Danowski et al. |
| 7,395,214 | B2 | 7/2008 | Shillingburg |
| 7,404,500 | B2 | 7/2008 | Marteau et al. |
| 7,471,993 | B2 | 12/2008 | Rosenblum |
| 7,587,259 | B2 | 9/2009 | Berg et al. |
| 7,715,277 | B2 | 5/2010 | De La Huerga |
| 7,755,478 | B2 | 7/2010 | Niemiec et al. |
| 7,774,097 | B2 | 8/2010 | Rosenblum |
| 7,831,336 | B2 | 11/2010 | Gumpert et al. |
| 7,844,361 | B2 | 11/2010 | Jean-Pierre |
| 7,885,725 | B2 | 2/2011 | Dunn et al. |
| 7,887,757 | B2 | 2/2011 | Chan et al. |
| 7,944,342 | B2 | 5/2011 | Sekura |
| 7,978,564 | B2 | 7/2011 | De La Huerga |
| 7,996,106 | B2 | 9/2011 | Ervin et al. |
| 8,014,232 | B2 | 9/2011 | Niemiec et al. |
| 8,019,471 | B2 | 9/2011 | Bogash et al. |
| 8,103,379 | B2 | 1/2012 | Michael et al. |
| 8,108,068 | B1 * | 1/2012 | Boucher ................ G01G 17/00 700/240 |
| 8,116,907 | B2 | 2/2012 | Hyde et al. |
| 8,212,677 | B2 | 7/2012 | Ferguson |
| 8,326,455 | B2 | 12/2012 | Dunn et al. |
| 8,391,104 | B2 | 3/2013 | De la Huerga |
| 8,511,304 | B2 | 8/2013 | Anderson et al. |
| 8,636,172 | B2 | 1/2014 | Dunn et al. |
| 8,666,539 | B2 | 3/2014 | Ervin et al. |
| 8,670,865 | B2 | 3/2014 | Coe |
| 8,700,212 | B1 | 4/2014 | Ives et al. |
| 8,752,728 | B2 | 6/2014 | Winget et al. |
| 8,874,260 | B2 | 10/2014 | Saltsov |
| 8,887,603 | B2 | 11/2014 | Mitani et al. |
| 9,014,847 | B2 | 4/2015 | Dunn et al. |
| 9,043,015 | B2 | 5/2015 | Ratnakar |
| 9,211,498 | B2 | 12/2015 | Akdogan et al. |
| 9,218,458 | B2 | 12/2015 | Baarman et al. |
| 9,235,689 | B2 | 1/2016 | Ervin et al. |
| 9,251,493 | B2 | 2/2016 | Gershtein et al. |
| 9,501,887 | B2 | 11/2016 | Berg |
| 10,073,954 | B2 * | 9/2018 | Chen ....................... B65B 35/46 |
| 10,106,283 | B2 | 10/2018 | Akdogan et al. |
| 10,360,751 | B2 | 7/2019 | Berg et al. |
| 10,633,135 | B2 | 4/2020 | Akdogan et al. |
| 10,940,093 | B2 * | 3/2021 | Williamson ........... G16H 20/13 |
| 11,139,057 | B2 | 10/2021 | Akdogan et al. |
| 11,160,730 | B2 * | 11/2021 | Townley ................ G16H 20/13 |
| 2001/0002448 | A1 | 5/2001 | Wilson et al. |
| 2002/0032582 | A1 | 3/2002 | Feenery, Jr. et al. |
| 2002/0070227 | A1 | 6/2002 | Ferruccio et al. |
| 2002/0147526 | A1 | 10/2002 | Siegel et al. |
| 2002/0149472 | A1 | 10/2002 | Roe et al. |
| 2002/0169635 | A1 | 11/2002 | Shillingburg et al. |
| 2003/0099158 | A1 | 5/2003 | De La Huerga et al. |
| 2004/0054436 | A1 | 3/2004 | Haitin et al. |
| 2004/0155780 | A1 | 8/2004 | Rapchak et al. |
| 2005/0098576 | A1 | 5/2005 | Fenton et al. |
| 2005/0230409 | A1 | 10/2005 | Von Schuckmann |
| 2005/0240305 | A1 | 10/2005 | Bogash et al. |
| 2006/0058724 | A1 | 3/2006 | Handfield et al. |
| 2006/0213921 | A1 | 9/2006 | Abdulhay et al. |
| 2007/0007301 | A1 | 1/2007 | Kaplan et al. |
| 2007/0088461 | A1 | 4/2007 | Haitin et al. |
| 2007/0093932 | A1 | 4/2007 | Abdulhay et al. |
| 2007/0156282 | A1 | 7/2007 | Dunn et al. |
| 2007/0215634 | A1 | 9/2007 | Levin et al. |
| 2008/0093371 | A1 | 4/2008 | Ubidia et al. |
| 2008/0114490 | A1 | 5/2008 | Jean-Pierre et al. |
| 2008/0140251 | A1 | 6/2008 | Handfield et al. |
| 2008/0300719 | A1 | 12/2008 | Duke |
| 2009/0069742 | A1 | 3/2009 | Larsen |
| 2009/0108016 | A1 | 4/2009 | Brown et al. |
| 2009/0134181 | A1 | 5/2009 | Wachman et al. |
| 2009/0167531 | A1 | 7/2009 | Ferguson |
| 2009/0182582 | A1 | 7/2009 | Hammon |
| 2009/0195648 | A1 | 7/2009 | Namineni et al. |
| 2009/0259336 | A1 | 10/2009 | Ratnakar et al. |
| 2009/0281657 | A1 | 11/2009 | Gak et al. |
| 2009/0283538 | A1 | 11/2009 | Collins et al. |
| 2009/0295575 | A1 | 12/2009 | Kennedy et al. |
| 2009/0299522 | A1 | 12/2009 | Savir et al. |
| 2010/0042255 | A1 | 2/2010 | Boutin et al. |
| 2010/0076595 | A1 | 3/2010 | Nguyen |
| 2010/0084420 | A1 | 4/2010 | Van Den Broek et al. |
| 2010/0096399 | A1 | 4/2010 | Ratnakar et al. |
| 2010/0100237 | A1 | 4/2010 | Ratnakar |
| 2010/0193579 | A1 | 8/2010 | Becket et al. |
| 2010/0228567 | A1 | 9/2010 | Wulf et al. |
| 2010/0256808 | A1 * | 10/2010 | Hui ..................... G07F 17/0092 221/133 |
| 2010/0268380 | A1 | 10/2010 | Waugh et al. |
| 2010/0270257 | A1 | 10/2010 | Wachman et al. |
| 2010/0305749 | A1 | 12/2010 | Coe |
| 2010/0318218 | A1 | 12/2010 | Muncy et al. |
| 2011/0060448 | A1 | 3/2011 | Gotou et al. |
| 2011/0060457 | A1 | 3/2011 | De et al. |
| 2011/0160896 | A1 | 6/2011 | Kim |
| 2011/0166700 | A1 | 7/2011 | Dunn |
| 2011/0251850 | A1 | 10/2011 | Stephens |
| 2012/0006708 | A1 | 1/2012 | Mazur |
| 2012/0041778 | A1 | 2/2012 | Kraft et al. |
| 2012/0044054 | A1 | 2/2012 | Hussain et al. |
| 2012/0101630 | A1 | 4/2012 | Daya et al. |
| 2012/0199650 | A1 | 8/2012 | Horst et al. |
| 2012/0316897 | A1 | 12/2012 | Hanina et al. |
| 2012/0323360 | A1 | 12/2012 | Lavin |
| 2012/0330460 | A1 | 12/2012 | Henderson et al. |
| 2013/0006652 | A1 | 1/2013 | Vahlberg et al. |

(56) References Cited

U.S. PATENT DOCUMENTS

| | | | | |
|---|---|---|---|---|
| 2013/0008918 | A1 | 1/2013 | Cronin et al. | |
| 2013/0060566 | A1 | 1/2013 | Shavelsky et al. | |
| 2013/0047986 | A1 | 2/2013 | Goede et al. | |
| 2013/0110283 | A1 | 5/2013 | Baarman et al. | |
| 2013/0134178 | A1 | 5/2013 | Lu et al. | |
| 2013/0238118 | A1 | 9/2013 | Haas | |
| 2013/0238119 | A1 | 9/2013 | Simmons et al. | |
| 2013/0304255 | A1 | 11/2013 | Ratnakar et al. | |
| 2014/0007806 | A1 | 1/2014 | Stanton et al. | |
| 2014/0025199 | A1 | 1/2014 | Berg et al. | |
| 2014/0058560 | A1 | 2/2014 | Kanagala | |
| 2014/0236351 | A1 | 8/2014 | Hyde et al. | |
| 2014/0263391 | A1 | 9/2014 | Akdogan et al. | |
| 2014/0263423 | A1 | 9/2014 | Akdogan et al. | |
| 2014/0263425 | A1 | 9/2014 | Akdogan et al. | |
| 2014/0267719 | A1 | 9/2014 | Akdogan et al. | |
| 2014/0277707 | A1 | 9/2014 | Akdogan et al. | |
| 2014/0277710 | A1 | 9/2014 | Akdogan et al. | |
| 2014/0278508 | A1 | 9/2014 | Akdogan et al. | |
| 2014/0278510 | A1 | 9/2014 | Akdogan et al. | |
| 2014/0350720 | A1 | 11/2014 | Lehmann et al. | |
| 2015/0090733 | A1 | 4/2015 | Park | |
| 2016/0039553 | A1 | 2/2016 | Akdogan et al. | |
| 2016/0039621 | A1 | 2/2016 | Akdogan et al. | |
| 2016/0042151 | A1 | 2/2016 | Akdogan et al. | |
| 2017/0001788 | A1 | 1/2017 | Akdogan et al. | |
| 2017/0096285 | A1 | 4/2017 | Akdogan et al. | |
| 2017/0132867 | A1* | 5/2017 | Berg | A61J 7/0481 |
| 2017/0348194 | A1* | 12/2017 | Duda | A61J 7/0084 |
| 2017/0355511 | A1 | 12/2017 | Akdogan et al. | |
| 2018/0055706 | A1* | 3/2018 | Madadin | G01G 21/22 |
| 2021/0354313 | A1 | 11/2021 | Kohen et al. | |
| 2022/0202652 | A1* | 6/2022 | Skeuse | A61J 7/0069 |
| 2022/0313558 | A1* | 10/2022 | Duda | A61J 7/0454 |

FOREIGN PATENT DOCUMENTS

| | | | |
|---|---|---|---|
| DE | 102011112953 | 3/2013 | |
| EP | 1087322 | 10/2001 | |
| EP | 1360658 | 6/2008 | |
| FR | 2788040 | 7/2000 | |
| JP | 2003252389 | 9/2003 | |
| JP | 2005219785 | 8/2005 | |
| WO | WO 0108106 | 2/2001 | |
| WO | WO2005115889 | 12/2005 | |
| WO | WO2009080309 | 7/2009 | |
| WO | WO2009137025 | 11/2009 | |
| WO | 2010110303 A1 | 9/2010 | |
| WO | WO2011054000 | 5/2011 | |
| WO | WO2012148976 | 11/2012 | |
| WO | WO 2014145218 | 9/2014 | |
| WO | WO2014145274 | 9/2014 | |
| WO | WO2016022714 | 2/2016 | |
| WO | WO-2018017561 A1 * | 1/2018 | B65B 1/06 |

OTHER PUBLICATIONS

International Searching Authority; International Search Report and Written Opinion for International Application No. PCT/US2020/011050 mailed Apr. 5, 2022; 12 pages.

EPO, "EP Application Serial No. 15830466.7, Communication Pursuant to Article 94(3) mailed Aug. 14, 2019", 8 pages.

JPO, "JP Application Serial No. 2018-107369, Office Action mailed Oct. 1, 2019", Japanese and English translations , 15 pages.

IP Australia, "AU Application Serial No. 2014233248, Examination Report mailed Jul. 18, 2019", 3 pages.

Earosas, "Pill Dispenser Prototype Video.wmv", https://www.youtube.com/watch?v=BwP2v5Mhuf8 Aug. 18, 2011 , 1 Pages.

IP Australia, "AU Application Serial No. 2015301018, First Examination Report mailed Jun. 17, 2019", 5 pages.

JPO, "JP Application Serial No. 2018-107369, Office Action mailed Jun. 11, 2019", Japanese and English translations , 5 pages.

IP Australia, , "CN Application No. 2014233248, Examination Report mailed Apr. 3, 2019", 5 pages.

IP Australia, , "AU Application No. 2014233248, Examination Report mailed Jul. 19, 2018", 5 pages.

IP Australia, , "AU Application No. 2014233248, Examination Report mailed Oct. 25, 2018", 5 pages.

IP Australia, , "AU Application No. 2014233218, Examination Report mailed May 26, 2017", 2 pages.

SIPO "CN Application No. 201480027727.7, First Office Action mailed Jan. 29, 2018", English and Chinese Translations, 14 pages.

EPO, "EPO Application No. 14764973.5, Examination Report mailed Nov. 17, 2017", 7 pages.

EPO, "EP Application Serial No. 14764973.5 , EP Search Report dated Aug. 22, 2016", 8 pages.

EPO, "EP Application Serial No. 14765247.3, EP Search Report dated Aug. 23, 2016", 8 pages.

EPO, "EP Application Serial No. 14765247.3, EP Search Report dated Aug. 22, 2016", 8 pages.

EPO, "EP Application Serial No. 18162398.4, Extended Search Report mailed Jul. 10, 2018", 7 pages.

WIPO, "International Application Serial No. PCT/US14/029940, Preliminary Report on Patentability mailed Sep. 15, 2015", 14 pages.

ISA, "International Application Serial No. PCT/US14/029940, Search Report and Written Opinion mailed Oct. 28, 2014", 17 pages.

WIPO, "International Application Serial No. PCT/US14/30008, Preliminary Report on Patentability mailed Sep. 15, 2015", 5 pages.

ISA, "International Application Serial No. PCT/US15/43848, Search Report and Written Opinion mailed Dec. 28, 2015", 13 pages.

U.S. International Searching AUT, "International Application Serial No. PCT/US2014/030008, Search Report and Written Opinion mailed Aug. 8, 2014", 6 pages.

JPO, "JP Application Serial No. 2016-503286, Office Action mailed Mar. 6, 2018", English and Japanese translation , 7 pages.

JPO, "JP Application Serial No. 2016-503306, Office Action mailed Feb. 6, 2018", English and Japanese Translations , 11 pages.

WIPO, "PCT Application No. PCT/US15/43848, International Preliminary Report on Patentability mailed Feb. 7, 2017", 10 pages.

USPTO, U.S. Appl. No. 14/819,054, Non-Final Office Action mailed Sep. 19, 2017, 8 pages.

USPTO, U.S. Appl. No. 14/819,054, Notice of Allowance mailed Jan. 18, 2018, 5 pages.

USPTO, U.S. Appl. No. 14/819,054, Notice of Allowance mailed Apr. 4, 2018, 5 pages.

USPTO, U.S. Appl. No. 14/819,054, Notice of Allowance mailed Jun. 19, 2018, 7 pages.

USPTO, U.S. Appl. No. 14/819,125, Non-Final Office Action mailed Oct. 5, 2016, 11 pages.

USPTO, U.S. Appl. No. 14/819,154, Final Office Action mailed Jul. 14, 2016, 11 pages.

USPTO, U.S. Appl. No. 14/819,154, Non-Final Office Action mailed Jan. 12, 2016, 12 pages.

USPTO, U.S. Appl. No. 16/137,265, Non-Final Office Action mailed Jul. 10, 2019, 8 pages.

USPTO, U.S. Appl. No. 16/137,265, Notice of Allowance mailed Jan. 15, 2020, 7 pages.

USPTO, U.S. Appl. No. 16/824,098, Non-Final Office Action mailed Oct. 21, 2020, 7 pages.

USPTO, U.S. Appl. No. 16/824,098, Notice of Allowance mailed Sep. 1, 2021, 12 pages.

USPTO, U.S. Appl. No. 29/772,676, application as filed on Mar. 3, 2021, 34 pages.

* cited by examiner

SENSING RETRIEVAL OF PILLS

CROSS-REFERENCE TO RELATED APPLICATIONS

This application claims the benefit of priority to U.S. Provisional Patent Application No. 63/132,923, filed on Dec. 31, 2020, the entire contents of which are incorporated herein by reference.

BACKGROUND

Automated pill dispensing is useful for improving the likelihood of end-user compliance with respect to proper timing and dosage of medications. The potential for improved compliance is manifest, for example, in medication regimens that involve several different types of medications, scheduled to be taken at various times throughout the day or night. However, techniques used for accurately and automatically retrieving pills for dispensing can be time-consuming, potentially frustrating some end-users to the point of decreased reliance on automated pill dispensing to manage medication regimens.

SUMMARY

Systems, devices, and methods of the present disclosure are generally directed to balancing competing considerations of speed and accuracy in picking individual pills from one or more containers, in accordance with the particular needs of an end-user. For example, the accuracy, speed, and efficiency of pill retrieval according to the various systems, devices, and methods described herein are facilitated by one or more measurements indicative of weight of one or more pills removed from a container for delivery to an end-user.

According to one aspect, a system for dispensing pills may include a plurality of containers, a retrieval arm movable into the plurality of containers to retrieve contents from the plurality of containers, a carrier supporting the plurality of containers, the carrier movable to adjust positions of the plurality of containers relative to a predetermined position, and a weighing assembly. The weighing assembly may include an actuator and a weight sensor. The actuator may be actuatable to control mechanical communication between the weight sensor and one of the plurality of containers at the predetermined position, and the weight sensor may be operable to measure weight of the one of the plurality of containers in mechanical communication with the weight sensor at the predetermined position.

In certain implementations, the retrieval arm may be movable into the one of the plurality of containers at the predetermined position. For example, the retrieval arm may be movable into the one of the plurality of containers at the predetermined position with the weight sensor in mechanical communication with the one of the plurality of containers at the predetermined position.

In some implementations, the actuator may be actuatable to move the plurality of containers relative to the retrieval arm.

In certain implementations, the carrier may define an opening at the predetermined position, and the actuator is actuatable to move the weight sensor into mechanical communication with the one of the plurality of containers at the predetermined position through the opening defined by the carrier. As an example, the carrier may include a track and a turntable, the turntable defining a plurality of slots, the plurality of containers is supportable in the plurality of slots and, with the plurality of containers supported in the plurality of slots of the turntable, the actuator is actuatable to rotate the turntable along the track to locate the one of the plurality of containers at the predetermined position. In some instances, the track may include a plurality of rails, the plurality of rails are concentric with one another and with the turntable, and the turntable is movable along the rails to move the one of the plurality of containers to the predetermined position. Further, or instead, rotation of the turntable along the track may move the plurality of containers relative to the retrieval arm. Additionally, or alternatively, with the plurality of containers supported in the plurality of slots of the turntable, each of the plurality of containers may be at a fixed radial distance from an axis of rotation of the turntable as the turntable rotates along the track. In certain instances, with the plurality of containers supported in the plurality of slots of the turntable, each of the plurality of containers may be movable parallel to an axis of rotation of the turntable along the track and, as the turntable rotates along the track, the one of the plurality of containers moves into mechanical communication with the weight sensor, through the opening, in a direction parallel to the axis of rotation of the turntable. Further, or instead, the track may include a first ramp section, the first ramp section partially defines the opening of the carrier, and the one of the plurality of containers is slidable along the first ramp section, as the turntable rotates in a rotation direction, to move through the opening and into mechanical communication with the weight sensor at the predetermined position. Additionally, or alternatively, the track may include a second ramp section, the second ramp section is spaced apart from the first ramp section in the rotation direction and partially defines the opening of the carrier and, with the one of the plurality of containers in mechanical communication with the weight sensor, the one of the plurality of containers is slidable along the second ramp section as the turntable rotates in the rotation direction to move through the opening and out of mechanical communication with the weight sensor at the predetermined position.

In some implementations, the weighing assembly may further include a platform coupled to the weight sensor and, at the predetermined position, the one of the plurality of containers is in mechanical communication with the weight sensor via the platform such that the entire weight of the one of the plurality of containers is supported on the platform.

In certain implementations, the weighing assembly may further include at least one damper positioned to limit movement of the weight sensor in response to weight on the weight sensor. Further, or instead, the weight sensor may have a first compliance, and the at least one damper may have a second compliance greater than the first compliance. For example, the damper may include a synthetic viscoelastic urethane polymer.

In some implementations, the actuator may include an electric motor actuatable to control the mechanical communication between the weight sensor and the one of the plurality of the containers at the predetermined position.

In certain implementations, the actuator and the weight sensor may be disposed in a center portion of the carrier such that the plurality of containers rotate about the weight sensor.

In some implementations, the weight sensor may include at least one load cell. As an example, the weight sensor may include a strain gauge load cell.

In certain implementations, the system may further include a controller in electrical communication with the weight sensor and the actuator, the controller configured to carry out operations including moving the retrieval arm into the one of the plurality of containers to retrieve contents of the one of the plurality of containers, actuating the actuator to move the one of the plurality of containers into mechanical communication with the weight sensor at the predetermined position, receiving, from the weight sensor, a signal indicative of weight of the contents of the one of the plurality of containers in mechanical communication with the weight sensor at the predetermined position, based on the signal indicative of weight of the contents of the one of the plurality of containers at the predetermined position, determining whether the retrieval arm has retrieved a single pill, and if the retrieval arm has not retrieved the single pill, initiating a remedial action. The controller may be additionally or alternatively configured to carry out operations including actuating the actuator to move the plurality of containers out of mechanical communication with the weight sensor and, with the plurality of containers out of mechanical communication with the weight sensor, taring the weight sensor. In some instances, the remedial action may include releasing material from the retrieval arm between successive retrieval attempts. Further, or instead, the remedial action may include repeating the operations of moving the retrieval arm into the one of the plurality of containers, receiving from the weight sensor a signal indicative of weight of contents of the one of the plurality of containers in mechanical communication with the weight sensor at the predetermined position, and determining whether the retrieval arm has retrieved the single pill. Additionally, or alternatively, the controller may be further configured to carry out operations including, based on the signal indicative of weight of the contents of the one of the plurality of containers, determining backlash of the carrier, wherein actuating the actuator to move the one of the plurality of containers into mechanical communication with the weight sensor at the predetermined position includes adjusting actuation of the actuator according to the backlash of the carrier.

In some implementations, the actuator may be actuatable to lift the one of the plurality of containers from the carrier at the predetermined position. Each one of the plurality of containers may include a tab, and the weight sensor is movable into mechanical communication with the tab of the one of the plurality of containers at the predetermined position to lift the one of the plurality of containers from the carrier at the predetermined position.

In certain implementations, the actuator may include a cam plate movable along the weight sensor to control mechanical communication between the weight sensor and the one of the plurality of containers at the predetermined position. For example, the cam plate may be linearly movable along the weight sensor to control mechanical communication between the weight sensor and the one of the plurality of containers at the predetermined position.

BRIEF DESCRIPTION OF THE DRAWINGS

Like reference symbols in the various drawings indicate like elements.

DETAILED DESCRIPTION

Figure 1A:
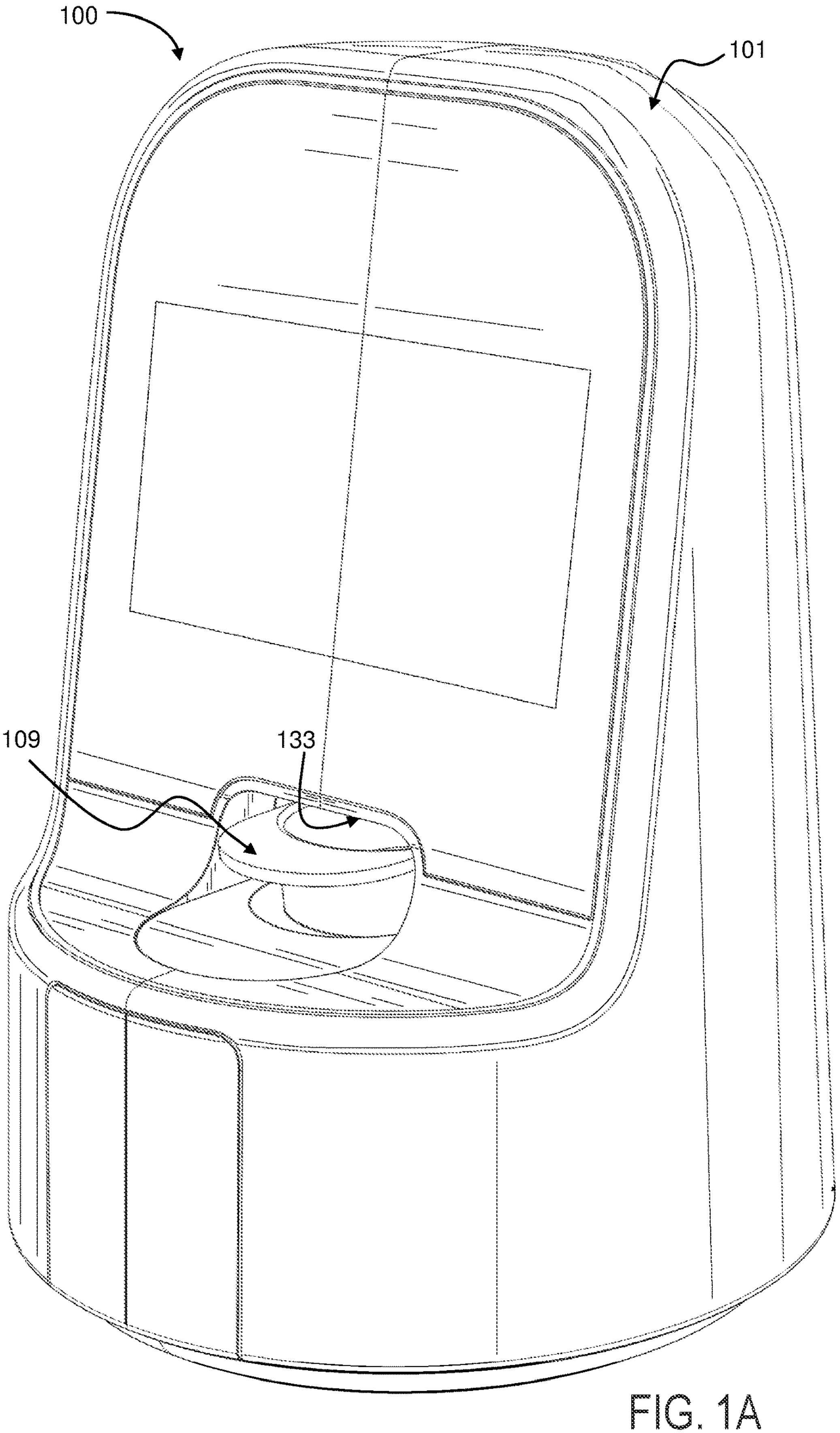
FIG. 1A is a front perspective view of a system for dispensing dispensable units.
Figure 1B:
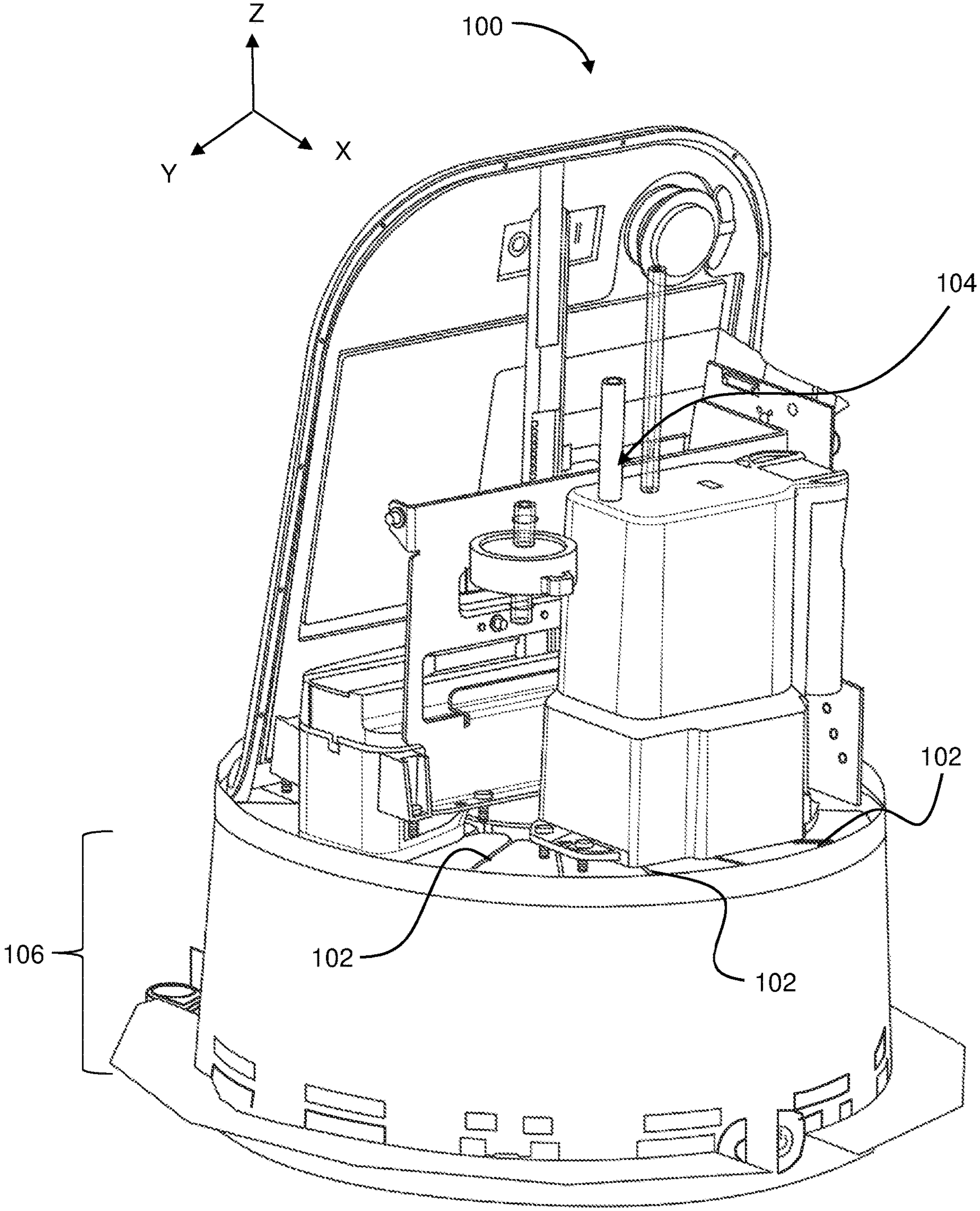
FIG. 1B is a rear perspective view of the system of FIG. 1A with a portion of a housing removed.

Embodiments will now be described more fully hereinafter with reference to the accompanying figures, in which exemplary embodiments are shown. The foregoing may, however, be embodied in many different forms and should not be construed as limited to the exemplary embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or," and the term "and" should generally be understood to mean "and/or."

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

While methods, systems, and devices are described below in the context of managing pill dispensing, it will be understood that embodiments described herein are provided by way of example and not limitation, and that various aspects of this disclosure may have additional applications independent from those described. For example, unless otherwise specified or made clear from the context, the systems, methods, and devices described herein may be adapted to any environment in which discrete units of consumable material are controllably dispensed on any predetermined or ad hoc schedule in a laboratory (e.g., chemical, pharmaceutical or life sciences laboratory), a packaging facility, a pharmacy, a care facility, or any of various different dispensing environments to end-users and/or care-givers. All such variations are intended to fall within the scope of this disclosure, unless a contrary intent is indicated.

As used herein, unless otherwise indicated or made clear from the context, the term “pill” shall be understood to refer to a discrete unit of a consumable material, and the term “pills” shall be understood to refer to a plurality of such discrete units. Thus, references to pills herein are intended to include a wide array of consumable items and form factors, including capsules, tablets, chewables, lozenges, dissolvables, sprinkles, dissolve-in-mouth micro-capsules, orally disintegrating tablets, chewable tablets (including jelly beans, gummies, and the like), gums, powder sachets, liquid sachets, vials, cups, cases, other storage forms, and so forth. Further, or instead, the pills may include any one or more of various different predetermined compositions and amounts. The composition of the pills may vary significantly according to the needs of end-users and, by way of example and not limitation, may include prescription medication, non-prescription or over-the-counter medication, nutritional supplements, vitamin supplements, mineral supplements, veterinary medications, veterinary nutritional supplements, food, or any other pharmaceuticals, nutraceuticals, or other item that may be advantageously dispensed and consumed in metered quantities. Thus, while pills may include ingestible substances, it shall be appreciated that pills may include topically applied substances (e.g., hand sanitizer, ointments, lotions, creams, and so forth) intended for external use.

As also used herein, the term “end-user” shall be understood to include a person for whom the pills are ultimately intended, as well as any one or more other individuals assisting in the care of the ultimate recipient of the pills. Thus, for example, an end-user can include a patient, a medical professional, a caregiver, or any combination thereof.

Further, as used herein, the term “mechanical communication” in the context of weight sensing shall be understood to include any manner and form of orientation of a container relative to a weight sensor such that the weight sensor may determine weight of the container. Thus, mechanical communication in the context of weight sensing shall be understood to include direct or indirect mechanical coupling between the weight sensor and the container being weighed, provided that such direct or indirect mechanical coupling allows for a weight determination of the container by the weight sensor. Stated differently, unless otherwise specified or made clear form the context, mechanical communication between a container and the weight sensor may include placing the container directly on the weight sensor and, further or instead, may include placing the container on a structure (e.g., a platform) coupled to the weight sensor in a manner permitting the force of the weight of the container to be transmitted to the weight sensor for measurement.

In the description that follows, for the sake of clear and efficient explanation, the pills shall be generally understood to be discrete units having nominally identical physical properties of shape, size, weight, and volume such that each pill is generally interchangeable with each other pill, in the absence of damage or another anomalous condition. Further, in this context, “nominally identical” shall be understood to refer to a manufacturing specification of a particular physical parameter. Thus, owing to normal manufacturing variations, a large number of pills with nominally identical physical parameters may be observed to have a variation of physical parameters within an acceptable range of the nominal parameter. In the description that follows, unless otherwise specified or made clear from the context, weight of the pills is advantageously used as a proxy for variations of other physical parameters, given that weight may be robustly and accurately measured according to the techniques described herein and generally has a predictable relationship to the other physical parameters of the pills. Further, while the pills may be nominally identical to one another with respect to physical parameters in some instances, it shall be appreciated that such similarity between the pills is not necessarily required, unless otherwise specified or made clear from the context.

Referring now to FIGS. 1A-1C and 2A-2F, a system 100 for dispensing pills may include a housing 101 disposed about a plurality of containers 102 (with each instance of the plurality of containers 102 referred to as a container 102), a retrieval arm 104, a carrier 106, and a weighing assembly 208, with the housing 101 generally providing restricted access at least to contents of the plurality of containers 102. Pills may be sorted into the plurality of containers 102, with each one of the plurality of containers 102 carrying a different type of pill to be dispensed to an end-user (e.g., a patient, a care-giver, or medical professional) of the system 100. The carrier 106 may support the plurality of containers 102, and the carrier 106 may be movable to adjust positions of the plurality of containers 102 relative to a predetermined position 210. The weighing assembly 208 may include an actuator 212 and a weight sensor 214. The actuator 212 may be actuatable to move the carrier 106 to locate one instance (e.g., a predetermined instance) of the plurality of containers 102 at the predetermined position 210 and, in doing so, may control mechanical communication between the weight sensor 214 and the container 102 at the predetermined position 210. At the predetermined position 210, the weight sensor 214 may be operable to measure weight of the container 102 in mechanical communication with the weight sensor 214 at the predetermined position 210.

In use, as described in greater detail below, movement of the retrieval arm 104 may be coordinated with movement of the carrier 106 to carry out pick-and-place retrieval of individual pills from the plurality of containers 102 and ultimately deliver the retrieved pills to a dispensing cup 109, where an end-user may access the retrieved pills according to a predetermined schedule or in response to an ad hoc request. In turn, as also described in greater detail below, movement of the carrier 106 may be coordinated with operation of the weighing assembly 208 to measure the weight of contents in each one of the plurality of containers 102 to determine whether a given retrieval attempt by the retrieval arm 104 was successful in retrieving a single pill, as is generally useful for accurately dispensing pills. Thus, as also described in further detail below, movement of the carrier 106 may be coordinated with operation of each of the retrieval arm 104 and the weight sensor 214 and, through such coordination, the system 100 may advantageously balance competing considerations of speed and accuracy in picking individual pills from the plurality of containers 102. Further, or instead, the coordinated movement of the carrier 106 relative to the weight sensor 214, according to the various different techniques described herein, may facilitate managing shock, vibration, or other disruptive forces experienced by pills during pick-and-place retrieval by the retrieval arm 104, thus providing robustness of retrieval across a wide range of physical properties of pills that may be stored in the plurality of containers 102.

In general, the carrier 106 may be rotatable about an axis C, and the plurality of containers 102 may be disposed at different angular positions about the axis C such that rotation of the carrier 106 changes the position of the plurality of containers 102 relative to the predetermined position 210. Stated differently, actuation of the actuator 212 may be controlled to rotate the carrier 106 about the axis C and, in doing so, change which instance of the plurality of containers 102 is brought into mechanical communication with the weight sensor 214 at the predetermined position 210 to determine the weight of the pills in the container 102. While the plurality of containers 102 may be arranged at different angular positions about the axis C (similar to numbers on a clock), it shall be appreciated that only a single instance of the plurality of containers 102 (the container 102 located at the predetermined position 210) is shown in FIGS. 1C and 2A-2F to facilitate clear illustration and efficient description Each one of the plurality of containers 102 may be brought into mechanical communication with the weight sensor 214 at the predetermined position 210 to determine the weight of pills in each one of the plurality of containers 102. Such weight information may be combined with knowledge about the type of pill in each one of the plurality of containers 102 to determine the respective number of pills in each one of the plurality of containers 102. For example, using a nominal or average weight for a known type of pill in one of the plurality of containers 102, the quantity of pills in the given one of the plurality of containers 102 may be determined based on the weight measured by the weight sensor 214. Specifically, the weight sensor 214 may be used to measure the weight of the given one of the plurality of containers 102 with and without pills therein, and these measurements may be used to determine a net weight of the pills in the given one of the plurality of containers. This net weight may be divided by the nominal weight or the average weight of the pills, according to the technique being used, to arrive at the quantity of pills in the given one of the plurality of containers 102. Significantly, this technique for determining the quantity of pills in the given one of the plurality of containers 102 may be repeated after each retrieval attempt made by the retrieval arm 104 to determine whether the retrieval attempt between two successive weight measurements corresponds to retrieval of only a single pill. As compared to the use of image-based techniques for determining whether a single pill has been retrieved, the foregoing weight-based determination of pill singulation may be more robust under a variety of conditions and, further or instead, may be less prone to degradation over time.

In certain implementations, the carrier 106 may define an opening 216 at the predetermined position 210, and the actuator may be actuatable to move the weight sensor 214 into mechanical communication with the instance of the plurality of containers 102 at the predetermined position through the opening defined by the carrier 106. More generally, the opening 216 defined by the carrier 106 may facilitate mechanically coupling weight sensor 214 to the container 102 at the predetermined position 210 when the carrier 106 is substantially stationary while mechanically decoupling the weight sensor 214 from the container 102 as the carrier 106 begins to move to change the position of the plurality of containers 102 relative to the predetermined position 210 and to the retrieval arm 104. In this context, substantially stationary shall be understood include low-speed/low-impact relative movement that is incidental to initially establishing mechanical communication between the weight sensor 214 and the container 102. As compared to attaching a weight sensor to a container to avoid relative motion between the weight sensor and the container, the moving the each of the plurality of containers 102 individually through the opening 216 to establish mechanical communication with the weight sensor 214 to carry out a corresponding weight measurement may offer advantages with respect to lower cost and/or improved robustness.

As an example, the carrier 106 may include a track 218 and a turntable 220. The turntable 220 may define a plurality of slots 222 corresponding in size, shape, and number to the plurality of containers 102 such that each instance of the plurality of containers 102 may be supported (e.g., releasably supported) in a respective instance of the plurality of slots 222. With such a correspondence between the plurality of containers 102 and the plurality of slots 222, it shall be appreciated that the angular position of the turntable 220 relative to the track 218 may be used as a proxy for determining and controlling the angular position of the plurality of containers 102. That is, with the plurality of containers 102 supported in the plurality of slots 222, each of the plurality of containers 102 may be at a fixed radial distance from the center axis C (which is the axis of rotation of the turntable 220) as the turntable 220 rotates along the track 218. For example, rotation of the turntable 220 along the track 218 may move the plurality of containers 102 relative to the retrieval arm 104 and, thus, the fixed radial distance of the plurality of containers 102 away from the center axis C may facilitate accurately positioning the retrieval arm 104 within an instance of the plurality of slots 222 during a retrieval attempt. Further, or instead, as compared to moving containers radially, the fixed radial distance of the plurality of containers 102 relative to the center axis C may be useful for forming the housing 101 with a smaller overall footprint, which takes up less counter space.

With the plurality of containers 102 held by the turntable 220 at a fixed radial distance from the center axis C, movement of each of the plurality of containers 102 may be restricted such that each of the plurality of containers 102 is movable only in directions parallel to the center axis C. Such restricted movement of the plurality of containers 102 may reduce the likelihood of inadvertent tipping or other unintended dislodgement of the plurality of containers 102 from the turntable 220 while nevertheless facilitating control of mechanical communication between the container 102 and the weight sensor 214. For example, as the turntable 220 rotates along the track 218, the container 102 at the predetermined position 210 may move into mechanical communication with the weight sensor 214, through the opening 216 in a first direction parallel to the center axis C of the turntable 220. With the container 102 in mechanical communication with the weight sensor 214, the container 102 and any pills therein may be weighed according to any one or more of the various different techniques described herein.

Following establishment of mechanical communication between the weight sensor 214 and the container 102, continued and/or reversed rotation of the turntable 220 about the center axis C of the turntable 220 may cause the container 102 move in a second direction parallel to the center axis C of the turntable 220. The second direction is opposite the first direction. Accordingly, movement in the second direction moves the container 102 through the opening 216 and out of mechanical communication with the weight sensor 214 such that the turntable 220 and the plurality of containers 102 supported thereon may move relative to the weight sensor 214 to place another instance of the plurality of containers 102 into contact with the weight sensor 214. This process may be repeated as many times as necessary or desirable to carry out retrieval of pills to satisfy a particular regimen associated with an end-user.

In certain instances, the opening 216 may be defined by the track 218 of the carrier 106. This may be particularly advantageous for reducing or eliminating tolerance stack-ups that can interfere with accurate and controlled placement of the container 102 into mechanical communication with the weight sensor 214. Further, or instead, because the turntable 220 rotates along the track 218, the opening 216 defined by the track 218 may advantageously reduce the amount of travel, parallel to the center axis C, required to move the container 102 through the opening 216 to establish and disrupt mechanical communication with the weight sensor 214, as needed to carry out the various different retrieval techniques described herein. Less travel required in the first direction and second direction parallel to the center axis C may correspond to lower shock, vibration, or other unintended forces on the pills in contained in the plurality of containers 102, thus generally reducing the potential for damaging the weight sensor 214 and/or reducing the potential for damaging the pills in the container 102.

In some instances in which the opening 216 is defined along the track 218, the track 218 may include a first ramp section 224 that partially defines the opening 216. For example, the container 102 may be slidable along the first ramp section 224, as the turntable 220 rotates in a rotation direction about the center axis C, to move through the opening 216 and into mechanical communication with the weight sensor 214 at the predetermined position 210. More specifically, the first ramp section 224 may extend in a direction from the turntable 220 toward the weight sensor 214 to guide the container 102 gradually onto the weight sensor 214 as the turntable 220 rotates along the track 218. Further, or instead, the track 218 may include a second ramp section 225 at least partially defining the opening 216 of the carrier 106 and spaced apart from the first ramp section 224 in the rotation direction of the turntable 220. Such relative spacing between the first ramp section 224 and the second ramp section 225 may facilitate gradually moving the container 102 away from the weight sensor 214 as the turntable 220 rotates to position another instance of the plurality of containers 102 at the predetermined position 210. That is, with the container 102 in mechanical communication with the weight sensor 214, the container 102 may be slidable along the section ramp section 225 as the turntable 220 rotates in the rotation direction to move through opening 216 and out of mechanical communication with the weight sensor 214 at the predetermined position. Here again, gradual movement of the container 102 away from the weight sensor 214 and along the second ramp section 225, may be useful for reducing the likelihood of wear or damage to the weight sensor 214 and/or pills in the container 102.

In general, the track 218 may include any one or more features useful for stably supporting the turntable 220 to limit vibration or other unintended movement of the plurality of containers 102 supported on the turntable 220 as the actuator 212 moves the turntable 220 along the track 218. As an example, the track 218 may include a plurality of rails

226 that are concentric with one another and with the turntable 220 about the center axis C. The turntable 220 may be movable along the plurality of rails 226 to move the container 102 toward or away from the predetermined position 210, according to any one or more of the various weight measurement techniques described herein. Because the plurality of rails 226 match the intended path of motion of the turntable 220, the turntable 220 may be in contact with the plurality of rails 226 along several different points, as is useful for maintaining stability of the plurality of containers 102, and the contents therein, as the turntable 220 rotates. As compared to less stable support with fewer points of contact, the turntable 220 in contact with several different points on the plurality of rails 226 may be rotated at higher speeds to facilitate more rapid pill dispensing by the system 100.

In general, the weighing assembly 208 may be supported in a fixed position on the carrier 106, as may be useful for positioning portions of the weighing assembly 208 away from other elements of the system 100 that may produce vibrations that can interfere with weight measurement. For example, as described in greater detail below, the retrieval arm 104 may operate using vacuum pressure to remove a single pill from the container 102. In such implementations, it has been experimentally determined that a signal corresponding to weight measurements made by the weight sensor 214 (configured as a load cell for the experiments) may exhibit less noise when the weight sensor 214 is positioned lower along the housing 101 as compared to positioning the weight sensor 214 along a top portion of the housing, closer to the vacuum source.

Extrapolating from these experimental observations, it is believed that supporting the weighing assembly 208 in a fixed position on the carrier 106 may have further advantages with respect to dampening noise associated with a vacuum source. Thus, in certain implementations, the weight sensor 214 may be supported in a recess 228 defined by the track 218 such that the container 102 may be positionable into mechanical communication with the weight sensor 214 through the opening 216 as described. That is, given that the track 218 does not move during operation of the system 100, the weight sensor 214 supported in the recess 228 defined by the track 218 may remain substantially stationary, subject only to vibration transmitted to the weight sensor 214 through various structures in mechanical communication with the weight sensor 214 via the track 218.

In certain implementations, the weighing assembly 208 may further include at least one damper 230 positioned to limit movement of the weight sensor 214 in response to weight on the weight sensor 214. For example, in instances in which the weight sensor 214 an excessive load (e.g., during shipping), the at least one damper 230 may absorb at least a portion of this excessive load to reduce the likelihood of damage to the weight sensor 214. More specifically, in a given direction (e.g., in a direction parallel to the center axis C), the weight sensor 214 may have a first compliance, and the at least one damper may have a second compliance greater than the first compliance. Thus, to the extent the excessive load results in deflection of the weight sensor 214 into contact with the at least one damper 230, the more compliant material of the at least one damper 230 may absorb at least a portion of the excessive load to provide some measure of protection to the weight sensor 214 and, importantly, may be resilient such that this protection may be sustained through repetition of excessive load on the weight sensor 214. By way of example and not limitation, the at least one damper may include a synthetic viscoelastic urethane polymer.

The weight sensor 214 may be any one or more of various different types of weight sensors that produces an electrical signal indicative of weight (force) on the sensor, while also being compact, inexpensive, calibratable, and robust in the presence of unintended forces (e.g., during shipping and handling) and through gradual accumulation of debris. Thus, for example, the weight sensor 214 may include at least one load cell and, more specifically, for the range of weights associated with pill dispensing, the at least one load cell may be a 500 g load cell. By way of example and not limitation, such a load cell may include one or more of a strain gauge load cell, a pneumatic load cell, a hydraulic load cell, a vibrating wire load cell, and a capacitive load cell, or a piezoelectric load cell.

While the container 102 may be brought into direct contact with the weight sensor 214 in some cases, it shall be appreciated that the weighing assembly 208 may further include a platform 232 coupled to the weight sensor 214. In such implementations, the container 102 may be in mechanical communication with the weight sensor 214 via the platform 232 such that the entire weight of the container 102 is supported on the platform 232. The support provided by the platform 232 may facilitate maintaining the container 102 in a fixed orientation as the container 102 is weighed by the weight sensor 214. For example, the container 102 may be moved through the opening 216 to come to rest stably in three-point contact with the platform 232 as the weight sensor 214 detects a signal indicative of weight of the container 102 and any pills therein.

In general, the actuator 212 may be any one or more of various different types of actuators that may be actuated to produce controlled rotation of the turntable 220 relative to the track 218. For example, the actuator 212 may be an electric motor, such as a rotary actuator, actuatable to start and stop rotation of the turntable 220 to achieve movement of the container 102 into and out of mechanical communication with the weight sensor 214 to carry out the various different pill detection techniques described herein.

In general, the retrieval arm 104 may be movable into one or more instances of the plurality of containers 102 to retrieve a single pill with each successful retrieval attempt. While the retrieval arm 104 may be movable into the plurality of containers 102 along any angular position relative to the predetermined position 210, the retrieval arm 104 may be advantageously movable into the container 102 at the predetermined position 210. That is, at the predetermined position 210, the retrieval arm 104 may movable into the container 102 along a z-axis parallel to the center axis C of the turntable 220 such that the force exerted by the retrieval arm 104 on the pills in the container 102 may be detected by the weight sensor 214. Further, in some instances, this detected force may be used to limit movement of the retrieval arm 104 to reduce the likelihood of damaging the retrieval arm 104, the container 102, or pills within the container 102. Continuing with this example, to retrieve pills in each of the other instances of the plurality of containers 102, the actuator 212 may be actuatable to move another instance of the plurality of containers 102 to the predetermined position 210, where the retrieval arm 104 may again be moved along the z-axis to repeat the process of pill retrieval. It shall be appreciated that such movement of the retrieval arm 104 along the z-axis at the predetermined position 210 may be carried out as many times as necessary and in as many different instances of the plurality of containers 102 as necessary to retrieve the type and number of pills for dispensing to the end-user, such as may be dictated by a predetermined schedule or an ad hoc demand.

While the retrieval arm 104 has been described as being movable along the z-axis to move into the container 102, it shall be further appreciated that the retrieval arm 104 may be movable in an x-y plane (defined by x-y axes) away from the plurality of containers 102 supported on the carrier 106. For example, small amounts of movement of the retrieval arm 104 in the x-y plane above the predetermined position 210 may facilitate moving the retrieval arm 104 to a specific portion of the container 102 for the next retrieval attempt. Further, or instead, following each successful retrieval attempt of a single pill from the container 102, the retrieval arm 104 may be movable in the x-y plane to move from a position above the predetermined position 210 to a position above a drop zone 133, where one or more successfully retrieved pills may be released to the dispensing cup 109.

The retrieval arm 104 may include any one or more of various different features of retrieval arms described, for example, in U.S. Pat. No. 9,731,853, issued on Aug. 15, 2017, and entitled "DISPENSABLE UNIT RETRIEVAL MECHANISM," the entire contents of which are hereby incorporated herein by reference. As an example, the retrieval arm 104 may include a tube 134 and a nib 136. The tube 134 may be hollow, and the nib 136 may be supported along an end portion of the tube 134. In such implementations, the system 100 may further include a vacuum device 138 in fluid communication with the nib 136 via the tube 134, with the fluid communication between the vacuum device 138 and the nib 136 controllable to control suction force at the nib 136. That is, with the vacuum device 138 in fluid communication with the nib 136, suction force at the nib 136 may be used to draw pills from the container 102 as the retrieval arm 104 is moved, along the z-axis, into proximity of the pills in the container 102 at the predetermined position 210. In some instances, the suction at the nib 136 may inadvertently draw a fraction of a pill or more than one pill from the container 102 at the predetermined position 210. This may be detected, for example, based on a change in weight of the container 102 in mechanical communication with the weight sensor 214, before and after the retrieval attempt. In such cases, fluid communication between the vacuum device 138 and the nib 136 may be interrupted (e.g., by turning off the vacuum device 138 and/or by closing one or more valves) to allow the fraction of a pill or the multiple pills to fall from the nib 136 and back into the container 102. Similarly, in instances in which the weight sensor 214 detects a change in weight corresponding to retrieval of a single pill carried on the nib 136 of the retrieval arm, the vacuum device 138 may remain in fluid communication with the nib 136 until the retrieval arm is over the drop zone 133, where the fluid communication may then be interrupted to allow the single pill to fall into the drop zone 133 from the nib 136. Further, or instead, the vacuum device 138 may be reversible, as may be useful for blowing air out of the nib 136 to facilitate clearing debris from the nib 136.

In certain implementations, the system 100 may further include a controller 140 in electrical communication with one or more of the retrieval arm 104, the actuator 212, the weight sensor 214, or the vacuum device 138. The controller 140 may, for example, include a processing unit 142 and one or more non-transitory computer-readable storage media 144 having stored thereon instructions for causing the processing unit 142 to carry out one or more aspects of any one of the various different weight-based sensing techniques described herein for sensing retrieval of pills from the plurality of containers 102.

Figure 1C:
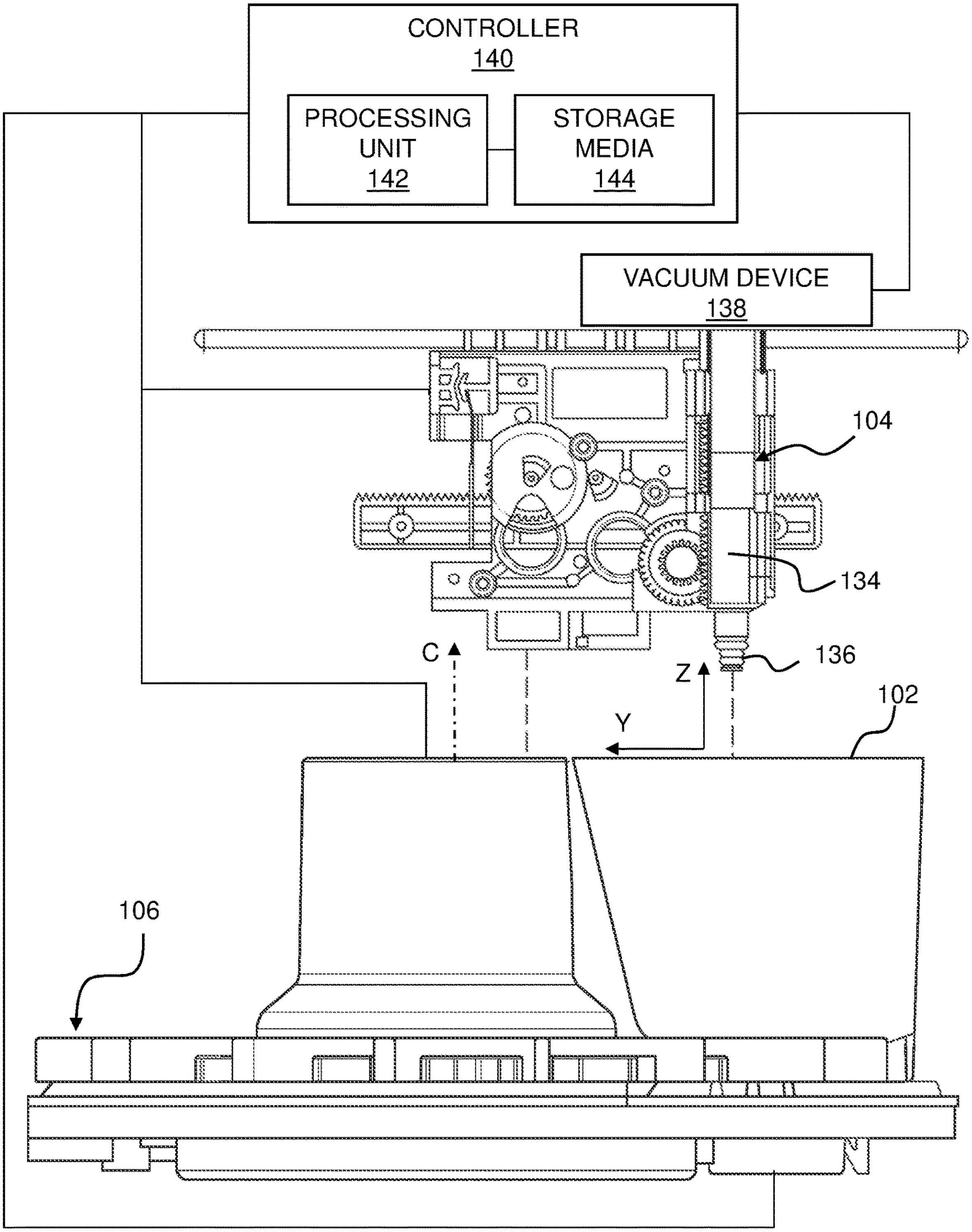
FIG. 1C is a schematic representation of a retrieval arm and a carrier of the system of FIG. 1A, with a container shown at a predetermined position on the carrier.
Figure 2A:
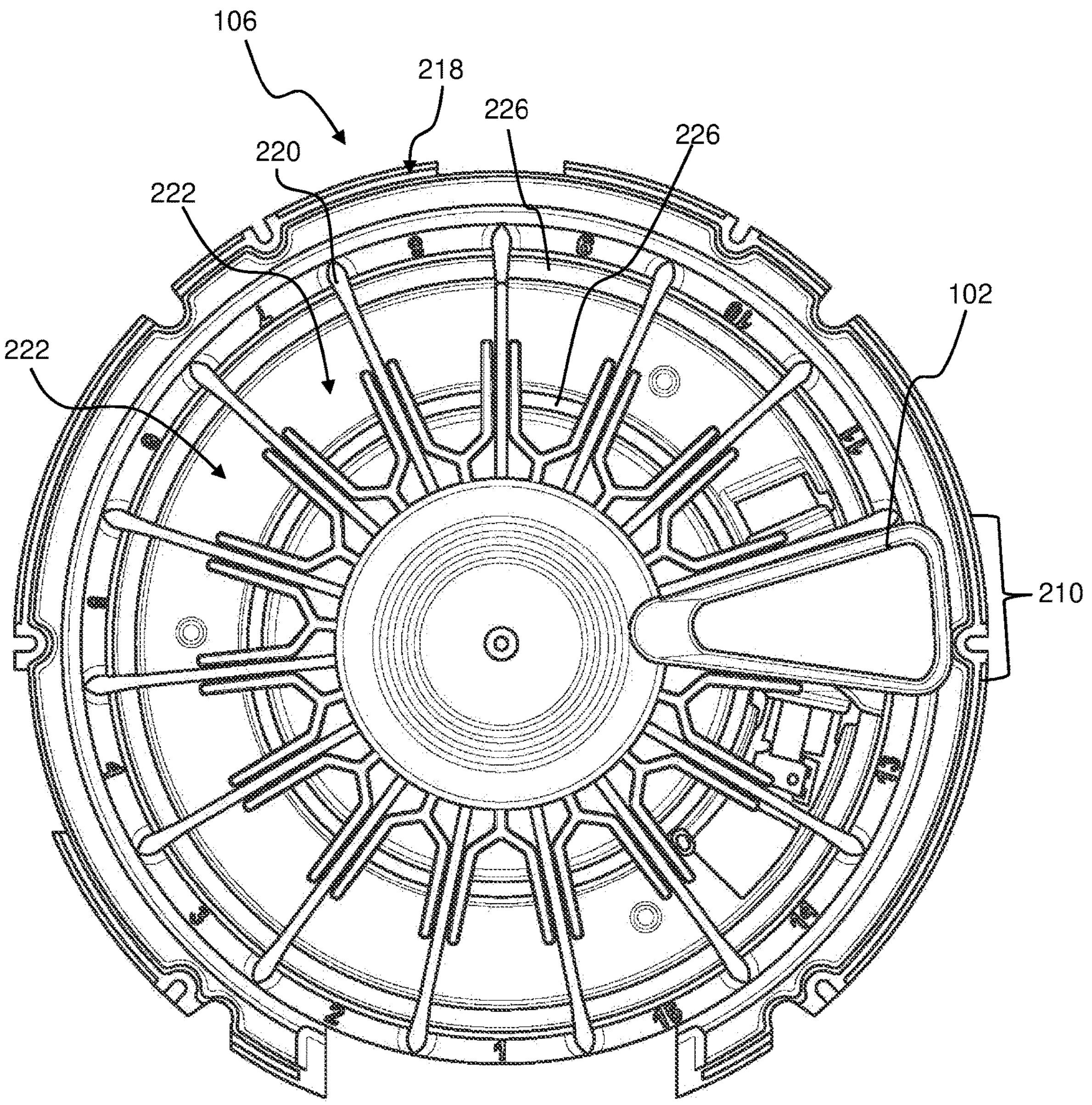
FIG. 2A is a top view of the carrier of the system of FIG. 1A, with the container shown at the predetermined position on the carrier.
Figure 2B:
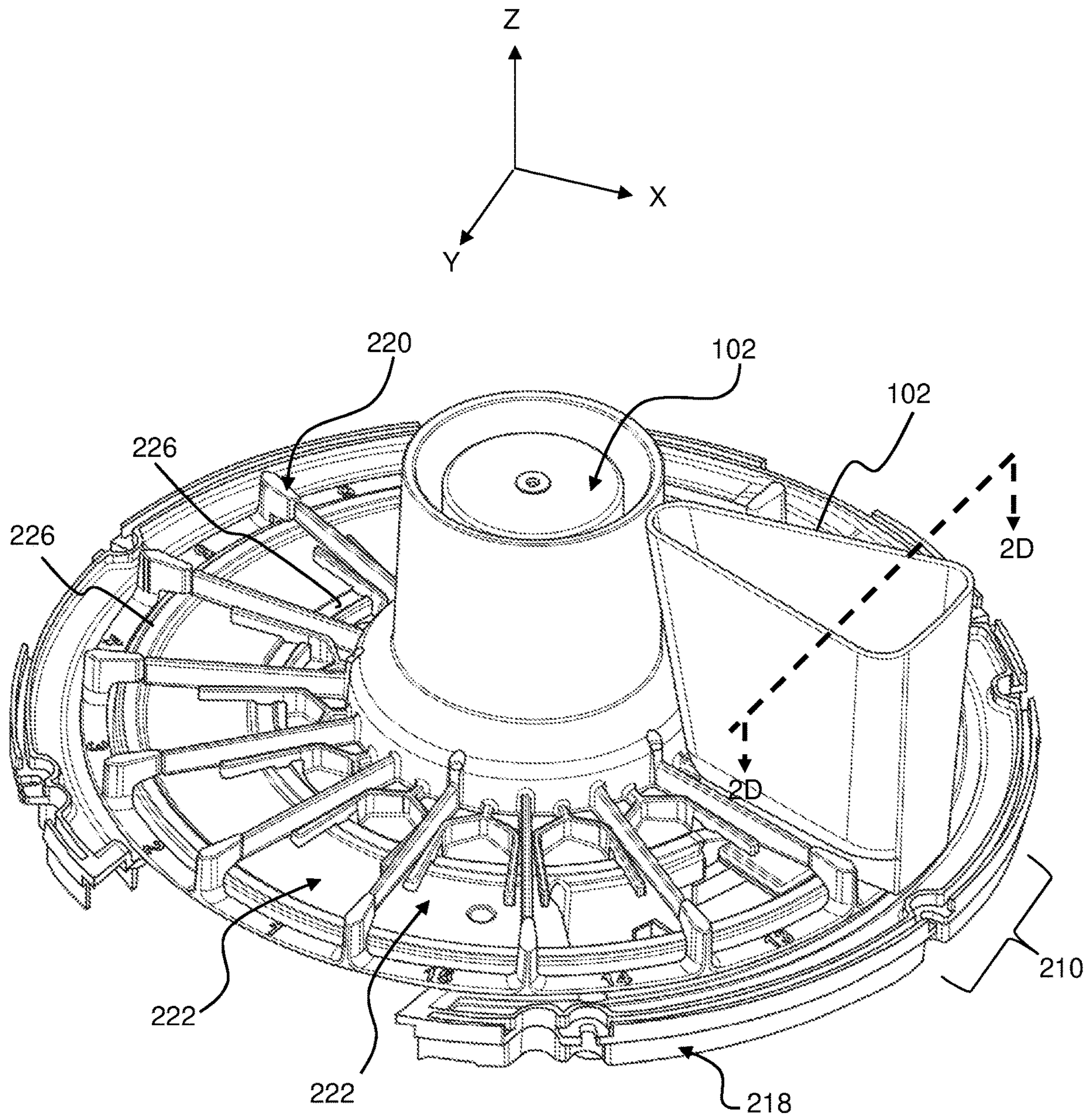
FIG. 2B is a perspective view of the carrier of the system of FIG. 2A, with the container shown at the predetermined position on the carrier.
Figure 2C:
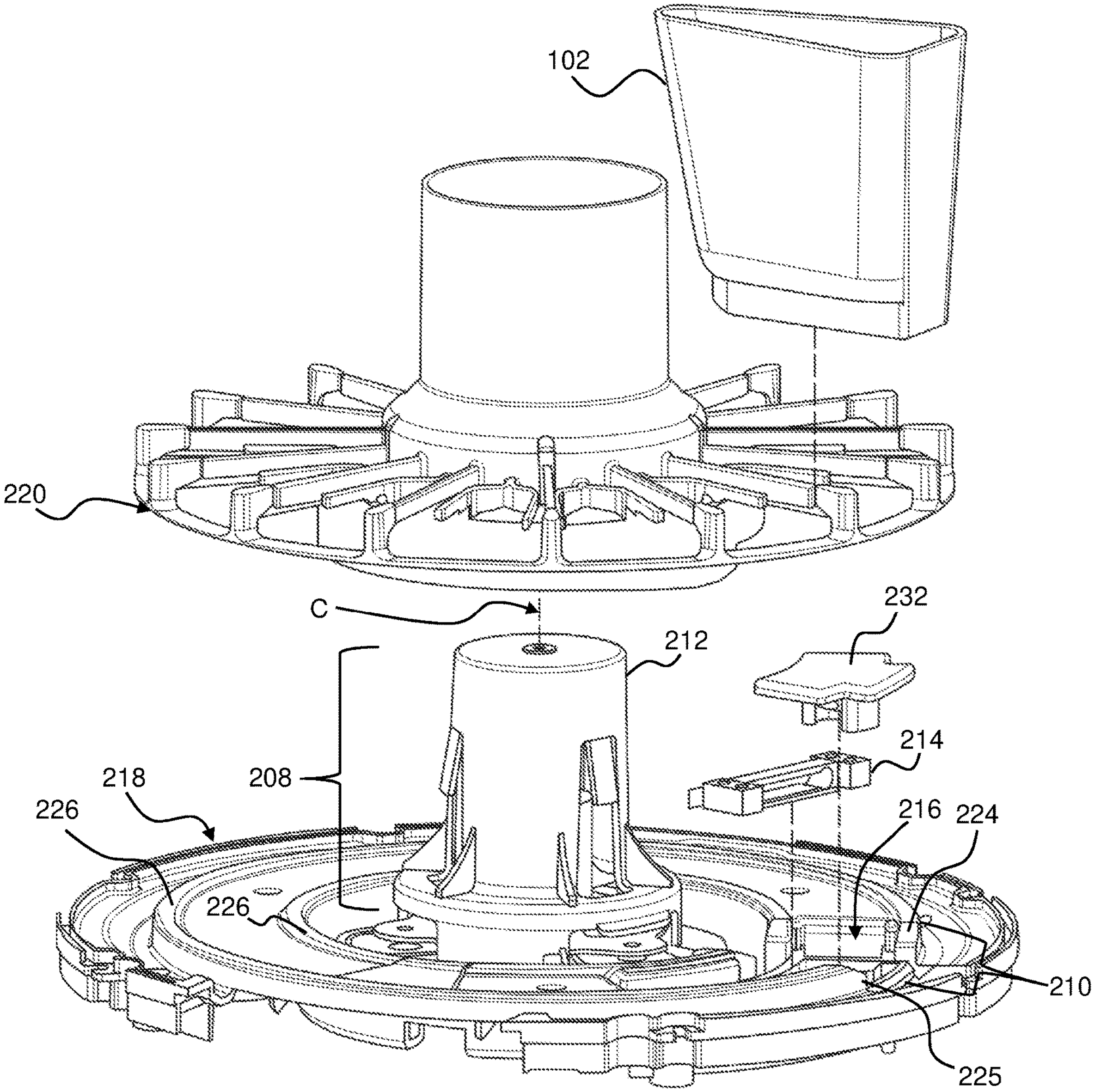
FIG. 2C is a partially exploded, perspective view of FIG. 2B, showing the position of a weighing assembly relative to the carrier and the container at the predetermined position on the carrier.
Figure 2D:
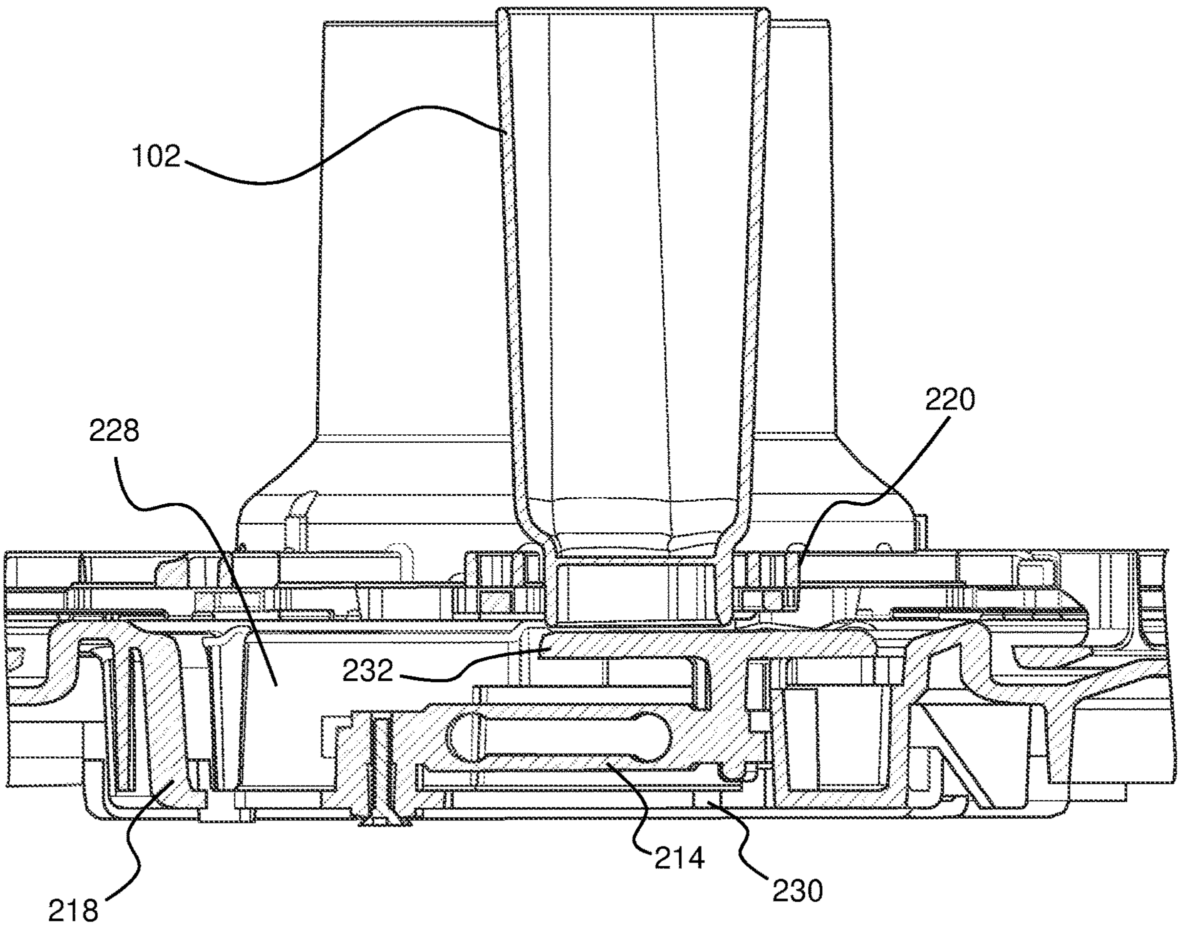
FIG. 2D is a side view of a cross-section of the container, the weighing assembly, and the carrier of FIG. 2C, with the cross-section taken along the line 2D-2D in FIG. 2B.
Figure 2E:
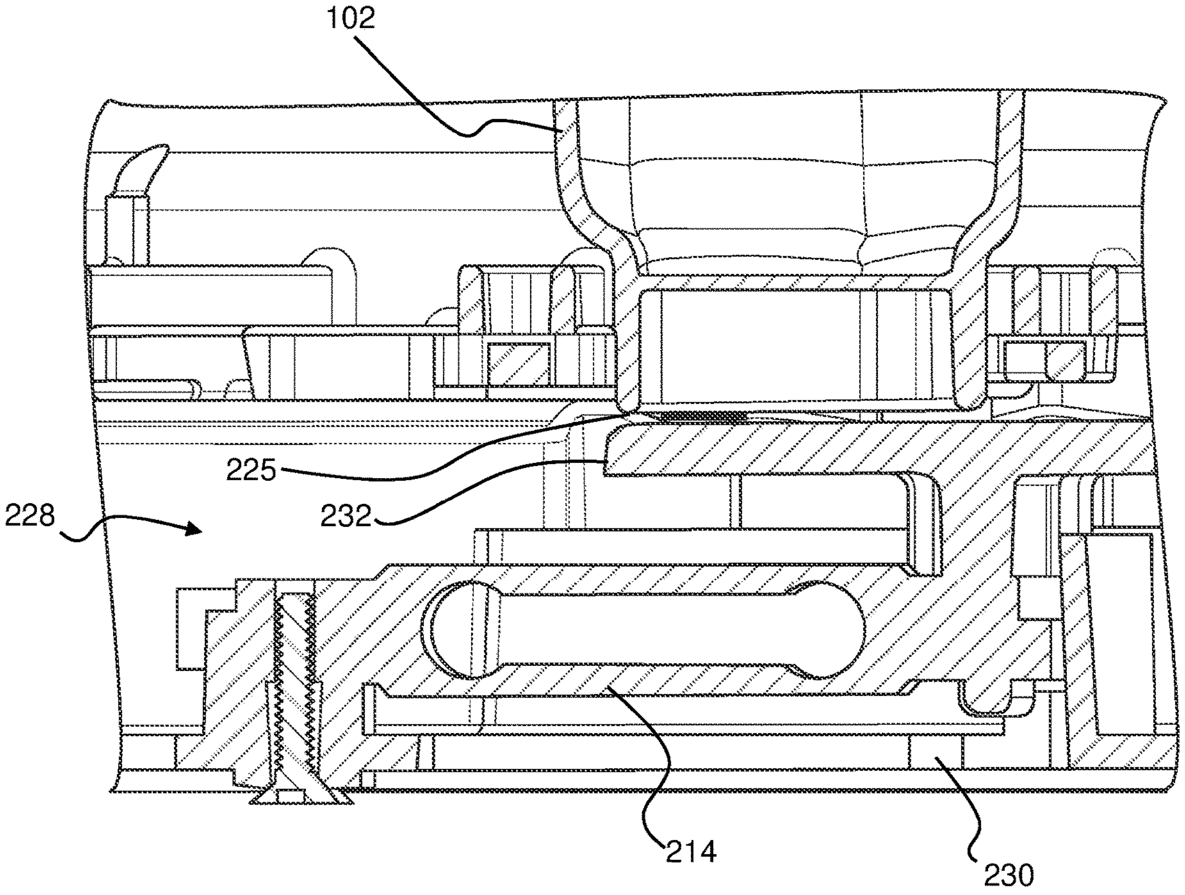
FIG. 2E is an enlarged side view of the area of detail 2E in FIG. 2D, shown with the container along a ramp and lifted away from the weighing assembly.
Figure 2F:
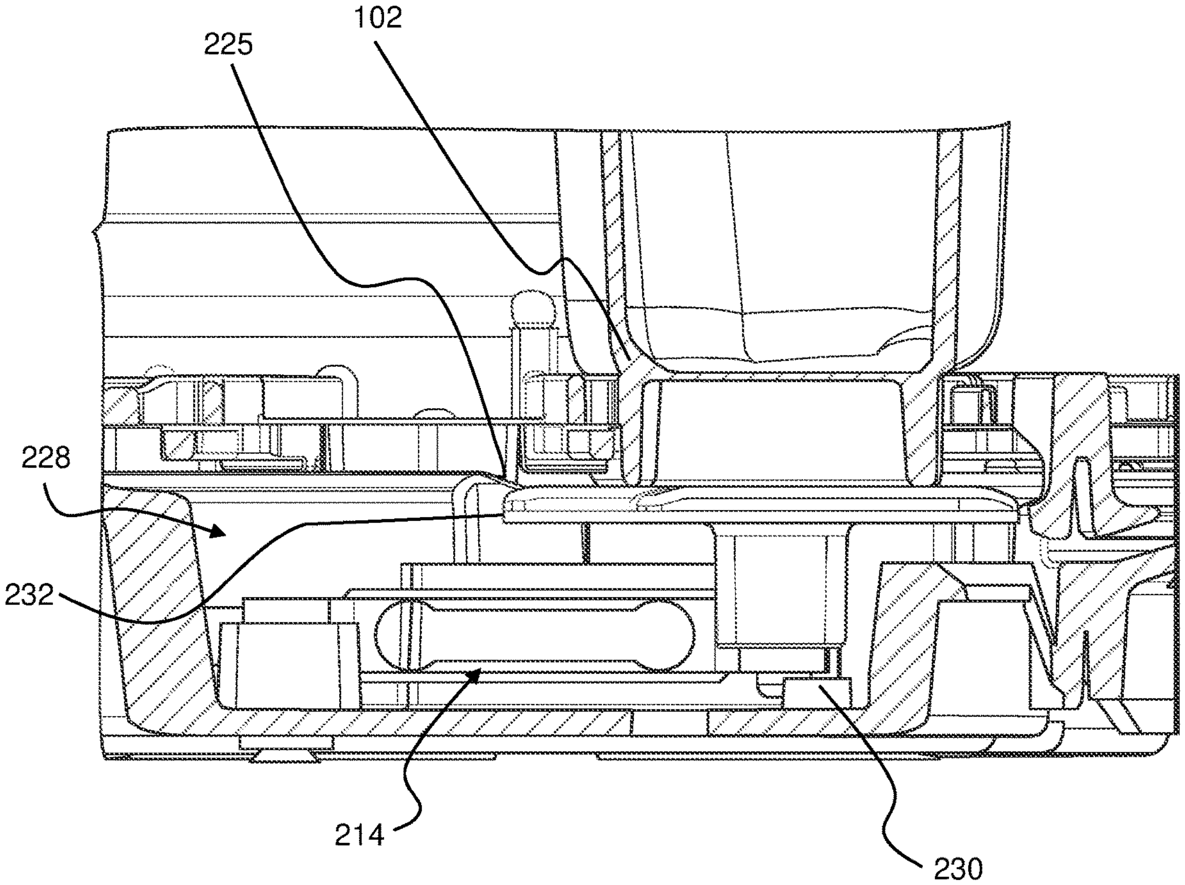
FIG. 2F is the enlarged side view of detail of FIG. 2E, shown with the container supported on the weighing assembly.
Figure 3:
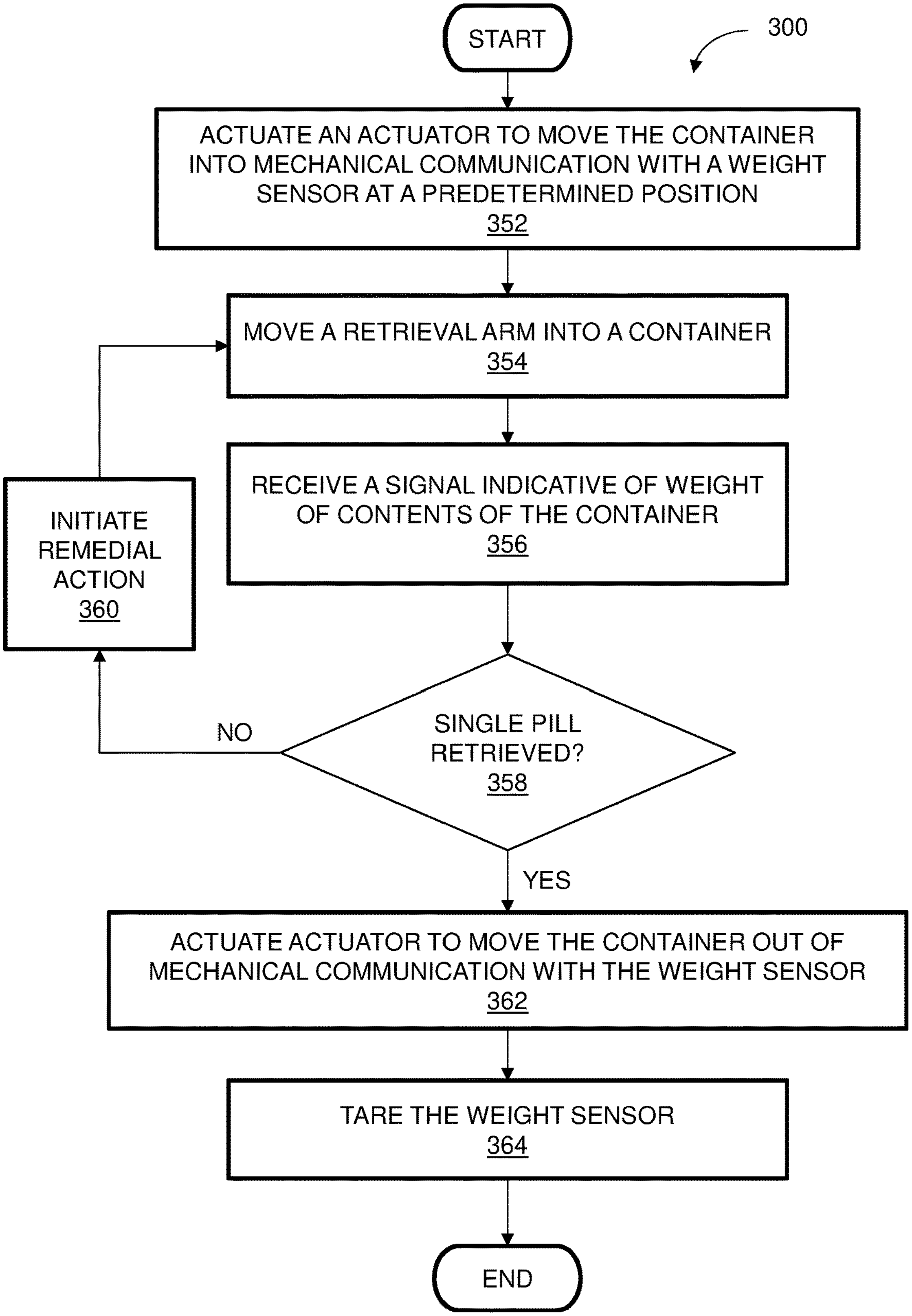
FIG. 3 is a flow chart of an exemplary method of sensing retrieval of pills.

FIG. 3 is a flow chart of an exemplary method 350 of sensing retrieval of pills. Unless otherwise specified or made clear from the context, it shall be understood that any one or more of the various different aspects of the exemplary method 350 may be carried out by the controller 140 (FIG. 1C) in electrical communication with the actuator 212 (FIG. 1C), the weight sensor 214 (FIG. 1C), the retrieval arm 104 (FIG. 1C), and the vacuum device 138 (FIG. 1C). For example, the one or more non-transitory computer-readable storage media 144 (FIG. 1C) may have stored thereon instructions for causing the processing unit 142 (FIG. 1C) to carry out one or more aspects of the exemplary method 350.

As shown in step 352, the exemplary method 350 may include actuating an actuator to move the one of the plurality of containers into mechanical communication with a weight sensor at a predetermined position. This actuation of the actuator may move the one of the plurality of containers according to any one or more of various different types of motion described herein for establishing mechanical communication between a weight sensor and a container containing pills therein. Thus, for example, the actuation of the actuator may rotate the one of the plurality of containers along a controlled path until the one of the plurality of containers is in mechanical communication with the weight sensor at the predetermined location.

In some instances, actuating the actuator to move the one of the plurality of containers into mechanical communication with the weight sensor at the predetermined position may include determining backlash of the carrier (e.g., backlash between the actuator and a turntable of the carrier) based on the signal indicative of the weight of the contents of the one of the plurality of containers. For example, this backlash may be observed in the signal indicative of weight as a lag time in which the signal indicative of weight of the contents of the container does not change when the actuator is actuated to move the container out of mechanical communication with the weight sensor. This lag time corresponds to backlash between the actuator and the carrier, and actuation of the actuator may be adjusted according to the backlash. That is, because of this lag time, the actuator may be actuated earlier (e.g., by an amount equal to the lag time) to facilitate maintaining accurate control over the positions of the plurality of containers relative to the weight sensor and the retrieval arm.

As shown in step 354, the exemplary method 350 may include moving a retrieval arm into one of a plurality of containers to retrieve contents (e.g., pills) from the one of the plurality of containers. This movement, may be, for example along a z-axis as described such that the retrieval arm plunges into the one of the plurality of containers.

As shown in step 356, the exemplary method 350 may include receiving, from the weight sensor, a signal indicative of weight of the contents of the one of the plurality of containers in mechanical communication with the weight sensor at the predetermined position. In certain implementations, the signal may include noise associated with, for example, operation of the retrieval arm, particularly in instances in which the retrieval arm is operable using suction from a vacuum device. Thus, certain implementations, receiving the signal indicative of weight of the contents of the one of the plurality of containers may include signal processing to remove, or at least reduce, the noise in the signal. Further, or instead, the signal indicative of the weight of the contents of the one of the plurality of containers may be a gross weight that includes the weight of the container itself. In some instances, the weight of the container may be known (e.g., by using the weight sensor to measure the weight of the container when the container is empty) and, thus, subtracted from the measured weight to provide an indication of a net weight of the pills in the container.

As shown in step 358, the exemplary method 350 may include determining whether the retrieval arm has retrieved a single pill in the retrieval attempt. This determination may, for example, be based on the signal indicative of the weight of the contents of the one of the plurality of containers at the predetermined position. For example, the signal indicative of the weight of the contents of the one of the plurality of containers may be compared before and after the retrieval attempt made by the retrieval arm. The difference between these signals provides an indication of the weight removed from the container during the retrieval attempt. That is, if the signal indicative of the weight of the container is the substantially the same (allowing for differences attributable to noise in the signal) before and after the retrieval attempt, this is an indication that the retrieval attempt was unsuccessful in removing any pills from the container. Similarly, if the signal indicative of the weight of the container corresponds to a weight less than the weight of a single pill after the retrieval attempt, this is an indication that the retrieval arm removed a fraction of a pill from the container and the retrieval attempt was unsuccessful. Further, if the signal indicative of the weight of the container corresponds to the weight of more than one pill after the retrieval attempt, this is an indication that the retrieval arm removed more than one pill from the container, and the retrieval attempt was unsuccessful.

As shown in step 360, the exemplary method 350 may include initiating a remedial action if the retrieval arm has not retrieved a single pill in the retrieval attempt. Such remedial action may be, for example, based on the type of failure detected by the weight sensor. Specifically, in instances in which no pill was retrieved by the retrieval arm, the vacuum device may be adjusted to increase suction at a nib of the retrieval arm. Further, or instead in instances in which only a fraction of a pill was retrieved by the retrieval arm, the vacuum device may be reversed to blow air through the nib of the retrieval arm to decrease the likelihood that the pill fragment will become lodged in the nib. Additionally, or alternatively, in instances in which more than one pill was retrieved by the retrieval arm during a retrieval attempt, the remedial action may include releasing the plurality of pills from the retrieval arm before another retrieval attempt is made (e.g., releasing the plurality of pills between successive retrieval attempts). Still further or instead, the remedial action may include repeating the operations of moving the retrieval arm into the one of the plurality of containers (step 354), receiving a signal indicative of weight of contents of the one of the plurality of containers in mechanical communication with the weight sensor at the predetermined position (step 356), and determining whether the retrieval arm has retrieved the single pill (step 358).

As shown in step 362, the exemplary method 350 may include actuating the actuator to move the plurality of containers out of mechanical communication with the weight sensor such that the weight sensor is unloaded.

As shown in step 364, the exemplary method 350 may include taring the weight sensor with the plurality of containers out of mechanical communication with the weight sensor such that the weight sensor is unloaded. Such taring may be useful for maintaining accuracy of the weight sensor over time and/or through varying conditions.

Having described certain aspects of weight-based sensing for sensing pill retrieval, attention is directed to additional or alternative approaches to weight-based sensing that may be used in addition to or instead of one or more of the approaches described above. More specifically, unless otherwise specified or made clear from the context any one or more of the following weight sensors may be used in addition to or instead of the weighing assembly 208 (FIG. 2C) of the system 100 (FIG. 1A) and, thus, for the sake of clear and efficient description aspects of the system 100 that interact with the weighing assemblies described below are not repeated.

Figure 4:
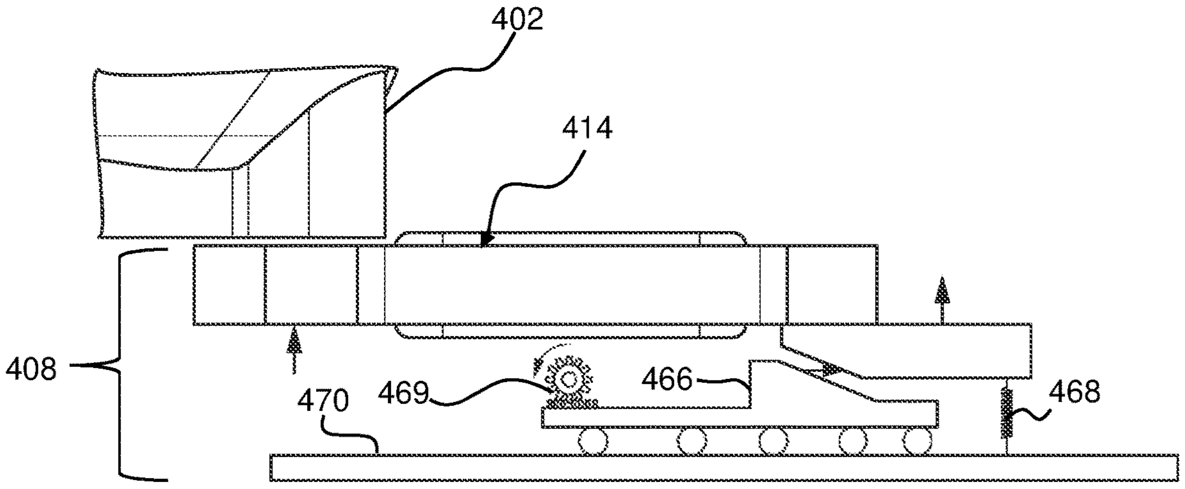
FIG. 4 is a schematic representation of a weighing assembly including a cam plate and a weight sensor spring-biased into contact with the cam plate.

Referring now to FIG. 4, a weighing assembly 408 may include a cam plate 466, a weight sensor 414, a spring 468, an actuator 469, and an anchor surface 470. The weight sensor 414 may be any one or more of the various different weight sensors described herein and, thus, may include a load cell. The cam plate 466 may be mechanically coupled to the actuator 469 such that actuation of the actuator 469 moves the the cam plate 466 (e.g., linearly) along the weight sensor 414 to control mechanical communication between the weight sensor 414 and a container 402 at a predetermined position. That is, the cam plate 466 may be moved in one direction to contact a corresponding surface of the weight sensor 414 and, in turn, this contact moves the weight sensor 414 into contact with the container 402. The spring 468 may be coupled to the weight sensor 414 and to the anchor surface 470 such that the spring 468 may be in tension when the cam plate 466 is in contact with the weight sensor 414. In this orientation, the spring 468 may bias the weight sensor 414 away from the container 402. It shall be appreciated that the orientation of the spring 468 relative to the weight sensor 414 and the anchor surface 470 may be changed such that the spring 468 may bias the weight sensor 414 into contact with the container 402.

Figure 5B:
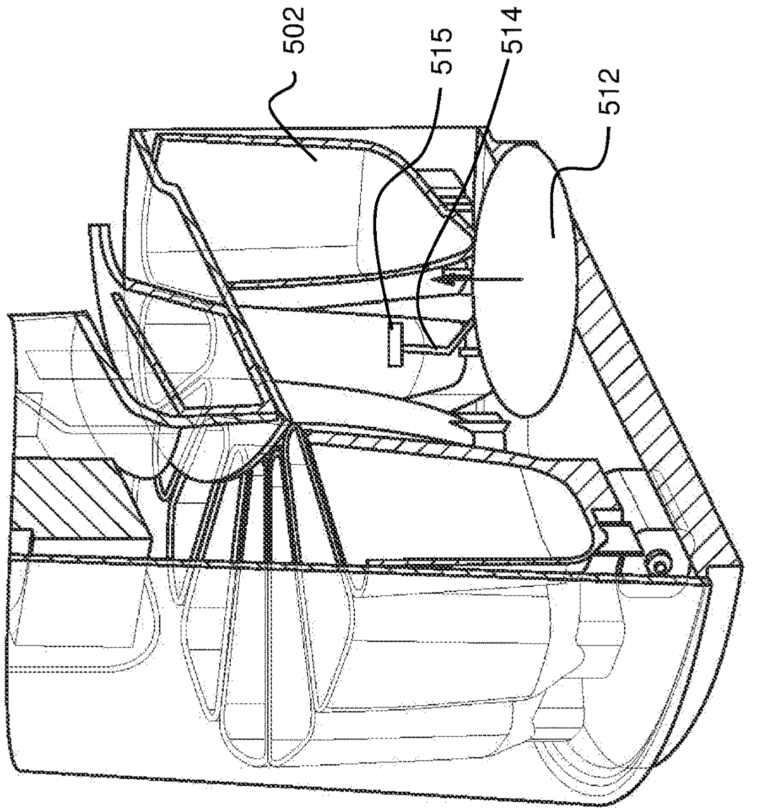
FIG. 5B is a schematic representation of the central hook of the weighing assembly of FIG. 5A engaged with a container.
Figure 5A:
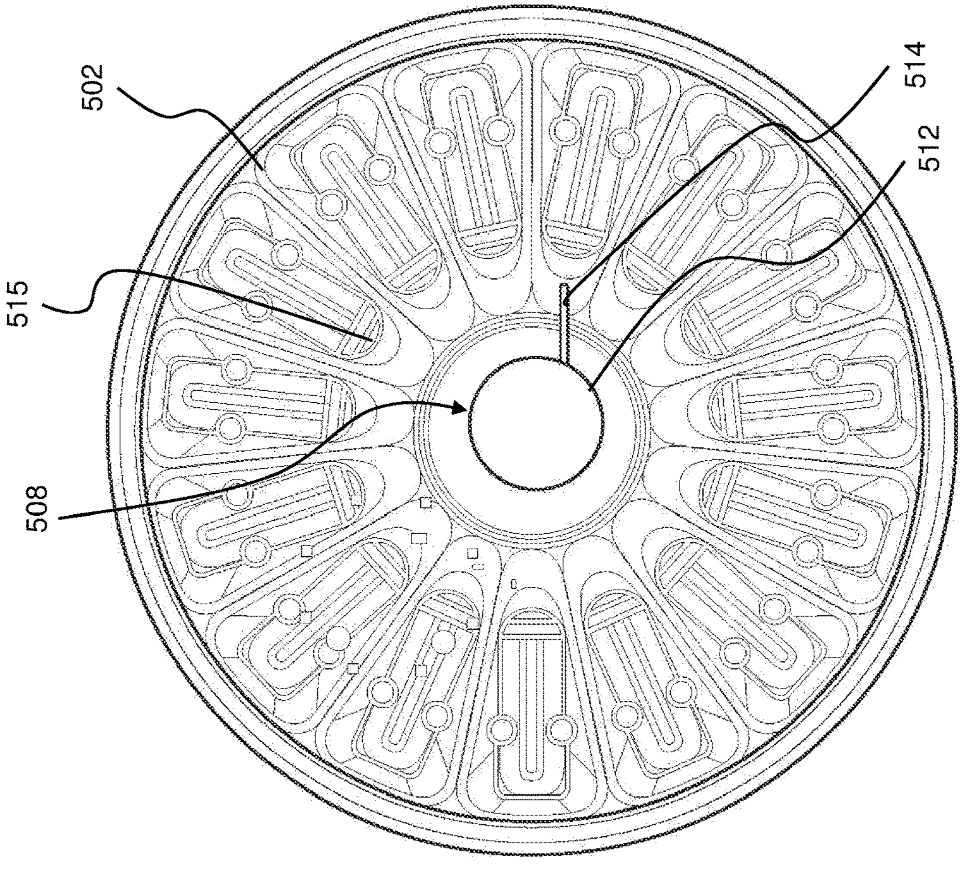
FIG. 5A is a top view of a carrier and a weighing assembly including a central hook.

Referring now to FIGS. 5A and 5B, a weighing assembly 508 may include an actuator 512 and a weight sensor 514 disposed in a center portion of a carrier 506 such that a plurality of containers 502 rotate about the weight sensor 514. For example, the actuator 512 may be actuatable to lift one of the plurality of containers 502 from the carrier 506 (e.g., at a predetermined position). As a more specific example, each one of the plurality of containers 502 may include a tab 515, and the weight sensor 514 may be movable into mechanical communication with the tab 515 of one of the plurality of containers 502 to lift the respective one of the plurality of containers 502 from the carrier 506 to determine weight of the lifted container.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps.

While particular embodiments have been shown and described, it will be apparent to those skilled in the art that various changes and modifications in form and details may be made therein without departing from the spirit and scope of this disclosure and are intended to form a part of the invention as defined by the following claims.

What is claimed is:

1. A system for dispensing pills, the system comprising:

a plurality of containers;

a retrieval arm movable into the plurality of containers to retrieve contents from the plurality of containers;

a carrier including a track and a turntable, the turntable defining a plurality of slots, the plurality of containers supportable in the plurality of slots, the carrier movable to adjust positions of the plurality of containers relative to a predetermined position, the track including a first ramp section at least partially defining an opening at the predetermined position; and a weighing assembly including an actuator and a weight sensor, wherein, with the plurality of containers supported in the plurality of slots of the turntable, each of the plurality of containers is movable parallel to an axis of rotation of the turntable along the track and the actuator is actuatable to rotate the turntable in a rotation direction along the track to slide one of the plurality of containers along the first ramp section, through the opening, and into mechanical communication with the weight sensor at the predetermined position, the first ramp section gradually guiding the one of the plurality of containers onto the weight sensor as the turntable rotates in the rotation direction along the track, and the weight sensor is operable to measure weight of the one of the plurality of containers in mechanical communication with the weight sensor at the predetermined position.

2. The system of claim 1, wherein the retrieval arm is movable into the one of the plurality of containers at the predetermined position.

3. The system of claim 2, wherein the retrieval arm is movable into the one of the plurality of containers at the predetermined position with the weight sensor in mechanical communication with the one of the plurality of containers at the predetermined position.

4. The system of claim 1, wherein the actuator is actuatable to move the plurality of containers relative to the retrieval arm.

5. The system of claim 1, wherein the weighing assembly further includes at least one damper positioned to limit movement of the weight sensor in response to weight on the weight sensor.

6. The system of claim 5, wherein the weight sensor has a first compliance, and the at least one damper has a second compliance greater than the first compliance.

7. The system of claim 1, wherein the track includes a plurality of rails, the plurality of rails are concentric with one another and with the turntable, and the turntable is movable along the rails to move the one of the plurality of containers to the predetermined position.

8. The system of claim 1, wherein rotation of the turntable along the track moves the plurality of containers relative to the retrieval arm.

9. The system of claim 1, wherein, with the plurality of containers supported in the plurality of slots of the turntable, each of the plurality of containers is at a fixed radial distance from an axis of rotation of the turntable as the turntable rotates along the track.

10. The system of claim 1, wherein the actuator includes an electric motor actuatable to control the mechanical communication between the weight sensor and the one of the plurality of the containers at the predetermined position.

11. The system of claim 1, further comprising a controller in electrical communication with the weight sensor and the actuator, the controller configured to carry out operations including moving the retrieval arm into the one of the plurality of containers to retrieve contents of the one of the plurality of containers, actuating the actuator to move the one of the plurality of containers into mechanical communication with the weight sensor at the predetermined position, receiving, from the weight sensor, a signal indicative of weight of the contents of the one of the plurality of containers in mechanical communication with the weight sensor at the predetermined position, based on the signal indicative of weight of the contents of the one of the plurality of containers at the predetermined position, determining whether the retrieval arm has retrieved a single pill, and if the retrieval arm has not retrieved the single pill, initiating a remedial action.

12. The system of claim 11, wherein the controller is further configured to carry out operations including actuating the actuator to move the plurality of containers out of mechanical communication with the weight sensor and, with the plurality of containers out of mechanical communication with the weight sensor, taring the weight sensor.

13. The system of claim 11, wherein the remedial action includes repeating the operations of moving the retrieval arm into the one of the plurality of containers, receiving from the weight sensor a signal indicative of weight of contents of the one of the plurality of containers in mechanical communication with the weight sensor at the predetermined position, and determining whether the retrieval arm has retrieved the single pill.

14. The system of claim 11, wherein the controller is further configured to carry out operations including, based on the signal indicative of weight of the contents of the one of the plurality of containers, determining backlash of the carrier, wherein actuating the actuator to move the one of the plurality of containers into mechanical communication with the weight sensor at the predetermined position includes adjusting actuation of the actuator according to the backlash of the carrier.

15. The system of claim 1, wherein the weighing assembly further includes a platform coupled to the weight sensor and, at the predetermined position, the one of the plurality of containers is in mechanical communication with the weight sensor via the platform such that the entire weight of the one of the plurality of containers is supported on the platform.

16. A system for dispensing pills, the system comprising:

a plurality of containers;

a retrieval arm movable into the plurality of containers to retrieve contents from the plurality of containers;

a carrier including a track and a turntable, the turntable defining a plurality of slots, the plurality of containers supportable in the plurality of slots, the carrier movable to adjust positions of the plurality of containers relative to a predetermined position, the track including a first ramp section at least partially defining an opening at the predetermined position; and a weighing assembly including an actuator and a weight sensor, wherein, with the plurality of containers supported in the plurality of slots of the turntable, each of the plurality of containers is movable parallel to an axis of rotation of the turntable along the track and the actuator is actuatable to rotate the turntable in a rotation direction along the track to slide one of the plurality of containers along the first ramp section and into mechanical communication with the weight sensor through the opening, in a direction parallel to the axis of rotation of the turntable, and the weight sensor is operable to measure weight of the one of the plurality of containers in mechanical communication with the weight sensor at the predetermined position, and wherein the track includes a second ramp section, the second ramp section is spaced apart from the first ramp section in the rotation direction and partially defines the opening of the carrier and, with the one of the plurality of containers in mechanical communication with the weight sensor, the one of the plurality of containers is slidable along the second ramp section as the turntable rotates in the rotation direction to move through the opening and out of mechanical communication with the weight sensor at the predetermined position.

* * * * *